United States Patent [19]
Simons et al.

[11] Patent Number: 5,887,174
[45] Date of Patent: *Mar. 23, 1999

[54] SYSTEM, METHOD, AND PROGRAM PRODUCT FOR INSTRUCTION SCHEDULING IN THE PRESENCE OF HARDWARE LOOKAHEAD ACCOMPLISHED BY THE RESCHEDULING OF IDLE SLOTS

[75] Inventors: Barbara Bluestein Simons; Vivek Sarkar, both of Palo Alto, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 666,719

[22] Filed: Jun. 18, 1996

[51] Int. Cl.$^6$ .................................................. G06F 9/44
[52] U.S. Cl. ...................... 395/709; 395/706; 395/397; 395/557
[58] Field of Search ................... 395/706, 709, 395/395, 392, 557

[56] References Cited

U.S. PATENT DOCUMENTS

| | | | |
|---|---|---|---|
| 4,435,756 | 3/1984 | Potash | 395/584 |
| 4,714,994 | 12/1987 | Oklobdzija et al. | 395/383 |
| 4,894,772 | 1/1990 | Langendorf | 395/587 |
| 4,984,154 | 1/1991 | Hanatani et al. | 395/587 |
| 5,040,107 | 8/1991 | Duxbury et al. | 395/392 |
| 5,121,473 | 6/1992 | Hodges | 395/587 |
| 5,127,092 | 6/1992 | Gupta et al. | 395/581 |
| 5,127,093 | 6/1992 | Moore, Jr. | 395/393 |
| 5,168,557 | 12/1992 | Shibuya | 395/383 |
| 5,201,057 | 4/1993 | Uht | 395/800.18 |
| 5,202,975 | 4/1993 | Rasbold et al. | 395/685 |
| 5,202,993 | 4/1993 | Tarsy et al. | 395/705 |
| 5,287,466 | 2/1994 | Kodama | 395/382 |

(List continued on next page.)

OTHER PUBLICATIONS

Coffman, E. G. and Graham, R. L., "Optimal Scheduling for Two–Processor Systems", Acta Informatica, 1:200–213, 1972.

Ullman, J., "NP–Complete Scheduling Problems", J. Comput. System Sci, 10, pp. 384–393, 1975.

Gabow, H., "Scheduling UET Systems on Two Uniform Processors and Length Two Pipelines", SIAM J. Computing, 17:810–829, 1988.

Hu, T. C., "Parallel Sequencing and Assembly Line Operations", Operations Research, 9:841–848, 1961.

Graham, R., "Bounds for Certain Multiprocessor Anomalies", Bell System Technical Journal, 45, pp. 1563–1581, 1966.

(List continued on next page.)

*Primary Examiner*—Kenneth S. Kim
*Attorney, Agent, or Firm*—Prentiss W. Johnson

[57] ABSTRACT

Instructions are scheduled for execution by a processor having a lookahead buffer by identifying an idle slot in a first instruction schedule of a first basic block of instructions, and by rescheduling the idle slot later in the first instruction schedule. The idle slot is rescheduled by determining if the first basic block of instructions may be rescheduled into a second instruction schedule in which the identified idle slot is scheduled later than in the first instruction schedule. The first basic block of instructions is rescheduled by determining a completion deadline of the first instruction schedule, decreasing the completion deadline, and determining the second instruction schedule based on the decreased completion deadline. Deadlines are determined by computing a rank of each node of a DAG corresponding to the first basic block of instructions; constructing an ordered list of the DAG nodes in nondecreasing rank order; and applying a greedy scheduling heuristic to the ordered list. An instruction in a second subsequent basic block of instructions may be rescheduled to execute in the rescheduled idle slot. This process may be repeated for each idle slot.

18 Claims, 10 Drawing Sheets

U.S. PATENT DOCUMENTS

| | | | |
|---|---|---|---|
| 5,291,615 | 3/1994 | Okamoto | 395/800.23 |
| 5,307,478 | 4/1994 | Rasbold et al. | 395/500 |
| 5,317,702 | 5/1994 | Morisada | 395/383 |
| 5,317,734 | 5/1994 | Gupta | 395/706 |
| 5,386,562 | 1/1995 | Jain et al. | 395/709 |
| 5,394,529 | 2/1995 | Brown, III et al. | 395/587 |
| 5,394,530 | 2/1995 | Kitta | 395/587 |
| 5,574,939 | 11/1996 | Keckler et al. | 395/800.24 |

OTHER PUBLICATIONS

Leung, J. Y. T., Vornberger, O., and Witthoff, J., "On Some Variants of the Bandwidth Minimization Problem", SIAM J. Computing, 13:650–667, 1984.

Bruno, J., Jones III, J. W., and So, K., "Deterministic Scheduling with Pipelined Processors", IEEE Trans., pp. 308–316, 1980.

Bernstein, D. and Gertner, I., "Scheduling Expressions on a Pipelined Processor with a Maximal Delay of One Cycle", ACM Trans. on Programming Languages and Systems, 11(1):57–66, Jan. 1989.

Palem, K. V., and Simons, B., "Scheduling Time–Critical Instructions on RISC Machines", Transactions on Programming Languages (TOPLAS), 15, No. 4, pp. 632–658, 1993.

Lawler, E., Lenstra, J. K., Martel, C., Simons, B., and Stockmeyer, L., "Pipeline Scheduling: A Survey", Technical Report RJ 5738, IBM Research, Jul. 1987.

Ebcoiglu, K., "A Compilation Technique for Software Pipelining of Loops with Conditonal Jumps", Proc. of the 20th Annual ACM Workshop on Microprocessing, pp. 69–79, Dec. 1987.

Hennessy, J. and Gross, T., "Postpass Code Optimization of Pipeline Constraints", ACM Trans. on Programming Languages and Systems, 5(3):422–448, Jul. 1983.

Gibbons, P. B. and Muchnick, S. S., "Efficient Instruction Scheduling for a Pipelined Architecture", Proc. SIGPLAN'86 Symp. on Compiler Construction, pp. 11–16, Jun. 1986, Published as SIGPLAN Notices vol. 21, No. 7.

Auslander, M. and Hopkins, M., "An Overview of the PL.8 Compiler", Proc. SIGPLAN'82 Symp. on Compiler Construction, pp. 22–31, Jun. 1982, Published as SIGPLAN Notices vol. 17, No. 6.

Warren, H., "Instruction Scheduling for the IBM RISC System/6000 Processor", IBM J. Research and Development, pp. 85–92, 1990.

Bernstein, D. and Rodeh, M., "Global Instruction Scheduling for Superscalar Machines", SIGPLAN91, pp. 241–255, 1991.

Fisher, J. A., "Trace Scheduling: a Technique for Global Microcode Compaction", IEEE Tran. on Computers, C–30 (7):478–490, Jul. 1981.

Palem, K. V., and Simons, B., "Instruction Scheduling for Compilers", IBM Research Report 8535, Dec., 1991.

Bernstein, D., Rodeh, M. and Gertner, I., "Approximation Algorithms for Scheduling Arithmetic Expressions on Pipelined Machines", J. of Algorithms, 10:120–139, Mar. 1989.

Bernstein, D., Cohen D., Lavon, Y. and Raimish V., Performance Evaluation of Instruction Scheduling on the IBM RISC System/6000, SIGMICRO Newsl. (USA), vol. 23, No. 1–2, Dec. 1992, pp. 226–235.

A Basic Block Example

A Minimum Completion time Schedule

The Idle Slot Has been Delayed

The Second Basic Block

An Edge from the First to the Second Basic Block

A Schedule for Figure

SYSTEM, METHOD, AND PROGRAM PRODUCT FOR INSTRUCTION SCHEDULING IN THE PRESENCE OF HARDWARE LOOKAHEAD ACCOMPLISHED BY THE RESCHEDULING OF IDLE SLOTS

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the field of computer systems, and more particularly to scheduling instructions for execution by a computer system having hardware lookahead.

2. Description of the Related Art

Modelling a Basic Block as a Graph

A basic block is a contiguous sequence of instructions that have the characteristic that if one of the instructions is ever executed by the program, all the instructions in the basic block will be executed. A basic block typically starts at a branch label and is typically terminated by some sort of branch instruction.

If instruction a must be executed prior to instruction b for program correctness, e.g., an action (for example, memory fetch) or computation performed by instruction a is used by instruction b, then there is a dependence from a to b. Instruction scheduling may be performed by a compiler or by processor hardware to reorder instructions without violating any dependencies so as to obtain the fastest possible execution of the computer program. Instruction scheduling must take into account restrictions that are associated with instructions, such as inter-instructional latencies (hereinafter referred to simply as latencies). Latency is present when there is an enforced delay between instruction a and instruction b, where instruction b depends on instruction a. For example, if instruction a loads some value from memory, and instruction b uses that value in a computation, then the delay caused by the memory access is modelled as a latency from a to b.

Because of dependencies between pairs of instructions in a basic block, the instruction scheduler utilizes a directed acyclic graph DAG) to model the basic block. A graph is a set of nodes and edges, with an edge consisting of a pair of nodes. In a directed graph each edge has a direction, i.e. edge (u,v) is directed from node u to node v, whereas edge (v,u) is directed from node v to node u. An instruction is represented as a node, and a dependence from u to v as a directed edge (u,v). A latency from u to v is represented as a weight on the edge (u,v). A graph is acyclic if it does not contain any cycles, i.e., if there is no node in the graph that can get back to itself by following a sequence of adjacent edges through the graph.

The Multiple Machine Scheduling Model

A problem that has been extensively studied involves scheduling a DAG on a set of m identical functional units or processors within a computer system or data processing system. In other words, an instruction may be scheduled on any of the functional units in the target computer system. The goal is to compute a schedule of instructions in which the last instruction finishes as early as possible, while not violating any of the precedence constraints of the DAG. Such a schedule requiring a minimum number of overall cycles is referred to as an optimal schedule or minimum completion time schedule or minimum makespan.

A method is polynomial time if there is some polynomial that takes the size of the problem as input and that computes an upper bound on the number of steps required by the method. Problems for which polynomial time methods exist are considered to be computationally tractable. By contrast, NP-complete or NP-hard problems are generally regarded as being computationally intractable. Although much work has been done on NP-complete and NP-hard problems, there is no known polynomial time method for constructing an optimal solution for any of these problems; it is conjectured that all these problems may require exponential time to solve in the worst case. However, because these categorizations are based on constructing optimal solutions, it is frequently possible to develop efficient methods or techniques for constructing good, if not necessarily optimal, solutions by using heuristics that do not guarantee optimality. One approach that is used is to develop a polynomial time optimal method for a simplified version of the problem one wishes to solve, and then to use that method to get a good solution for the actual problem. Most scheduling problems are NP-hard. Below the major instruction scheduling results are reviewed.

A number of scheduling problems that are NP-hard become computationally tractable if all instructions have unit execution time. The results in this paragraph all assume unit execution time. A polynomial time method for constructing an optimal schedule for the two identical processor scheduling problem was first obtained in 1972 by Coffinan, E. G. and Graham, R. L., "Optimal Scheduling for Two-Processor Systems", Acta Informatica, 1:200–213, 1972. In 1975, the problem of constructing an optimal schedule for an arbitrary number of identical processors was shown to be NP-complete by Ullman, J., "NP-Complete Scheduling Problems", J. Comput. System Sci, 10, pages 384–393, 1975. Subsequently, Gabow, H., "Scheduling UET Systems on Two Uniform Processors and Length Two Pipelines", SIAM J. Computing, 17:810–829, 1988, developed a faster "highest-level-first" method for the two identical processors scheduling problem. Whether or not it is possible to construct an optimal schedule in polynomial time for the three-processor scheduling problem is a major open problem. If the DAG is restricted to a forest of in-trees or a forest of out-trees (an in-tree is a tree in which each node has at most one successor, and an out-tree is a tree in which each node has at most one predecessor), then the method of Hu, T. C., "Parallel Sequencing and Assembly Line Operations", Operations Research, 9:841–848, 1961, constructs an optimal schedule in polynomial time for an arbitrary number of identical processors.

A greedy schedule is one in which the machine is never left with nothing to do if there is some instruction that could be scheduled. In 1966, Graham, R., "Bounds for Certain Multiprocessor Anomalies", Bell System Technical Journal, 45, pages 1563–1581, 1966, showed that any scheduling heuristic is guaranteed to come within a factor of two of the optimal completion time for the m-scheduling problem, where m is the number of processors.

Pipeline Scheduling for Unit Execution Times

The Coffinan-Graham approach can be adapted to optimally schedule a single two stage pipeline processor, see Leung, J. Y. T., Vomberger, O., and Witthoff, J., "On Some Variants of the Bandwidth Minimization Problem", SIAM J. Computing, 13:650–667, 1984. Gabow has shown that his method for two-processor scheduling generalizes to the case of an arbitrary DAG and a single pipeline with two stages. It is also straightforward to modify Hu's technique so that it can optimally schedule a forest of in-trees or a forest of out-trees on a set of m identical pipelines, each of which has precisely k stages, see Bruno, J., Jones III, J. W., and So, K., "Deterministic Scheduling with Pipelined Processors", IEEE Trans., pages 308–316, 1980.

Scheduling With 0/1 Latencies

Edge (u,v) has latency k if instruction v must wait k units after the completion of instruction u before it can begin execution. An edge has latency 0 if there is no required delay. Bernstein et al., Bernstein, D. and Gertner, I., "Scheduling Expressions on a Pipelined Processor with a Maximal Delay of One Cycle", ACM Trans. on Programming Languages and Systems, 11(1):57–66, January 1989, developed a method for constructing an optimal schedule for a problem with an arbitrary DAG, unit execution time per instruction, and latencies of 0 and 1. The Rank Method, developed by Palem et al., Palem, K. V., and Simons, B., "Scheduling Time-Critical Instructions on RISC Machines", Transactions on Programming Languages (TOPLAS), 15, No. 4, pages 632–658, 1993, also constructs an optimal schedule for scheduling an arbitrary DAG with unit execution times and latencies of 0 and 1 on a single processor. In addition, the Rank Method constructs a minimum tardiness (the amount by which any instruction fails to meet its deadline) schedule if the problem input has deadlines. Palem et al. have demonstrated that any greedy heuristic will construct a schedule that is within a factor of two of an optimal schedule for the problem of scheduling a DAG with arbitrary latencies on m processors.

Equivalence of the Different Models for Unit Execution Time

A latency scheduling problem in which all edges have the same latency k and instructions all have unit execution times is equivalent to a (k+1)-stage pipeline scheduling problem. The reason that latencies are k, but the pipelines have (k+1) stages, is that instructions in the latency problem all require a single unit of execution time independent of the latencies. Leung et al. shows that the k+1 stage pipeline problem is at least as hard as the k-machine scheduling problem when the input is an arbitrary DAG. Therefore, the problem of constructing an optimal schedule for a 4-stage pipeline problem or a problem in which the latencies are all equal to 3 is at least as hard as the three-machine scheduling problem. Although it is not known whether or not a polynomial time method exists for constructing minimum completion time schedules for problem instances in which the latencies are bounded above by some constant greater than one, it is known that the problem becomes NP-hard if the latencies can be arbitrarily large. Finally, even if the processor has only a single register, all the latencies are 1, and the DAG is a set of chains or threads, constructing an optimal schedule becomes NP-hard, see Palem et al.

The Assigned Processor Model

The assigned processor model most closely approximates the multiple functional unit processors that are being produced today. In the assigned processor model, an instruction must be scheduled on a particular functional unit, or perhaps on one of several functional units of a particular type. Unfortunately, this problem is very difficult to solve optimally. Lawler, E., Lenstra, J. K., Martel, C., Simons, B., and Stockmeyer, L., "Pipeline Scheduling: A Survey", Technical Report RJ 5738, IBM Research, July 1987, shows that constructing an optimal schedule is NP-complete, even if the DAG is only a set of chains or threads, and if instructions are all unit length and have to be placed on one of only two non-pipelined processors with only zero latencies. Lawler et al. also contains a negative result that shows that a highest level first (greedy) heuristic can perform very poorly when scheduling an arbitrary DAG on a set of identical pipeline processors. A VLIW (Very Long Instruction Word) machine can be considered to be a special case of an assigned processor (for an example, see Ebcioglu, K., "A Compilation Technique for Software Pipelining of Loops with Conditional Jumps", Proc. of the 20th Annual ACM Workshop on Microprocessing, pages 69–79, December 1987.).

Compiler-Related Results

Hennessy, J. and Gross, T., "Postpass Code Optimization of Pipeline Constraints", ACM Trans. on Programming Languages and Systems, 5(3):422–448, July 1983, have an $O(n^4)$ heuristic for instruction scheduling in which hazards can be introduced by the register allocator and by memory access. The $O(n^2)$ scheduling heuristic of Gibbons, P. B. and Muchnick, S. S., "Efficient Instruction Scheduling for a Pipelined Architecture", Proc. SIGPLAN'86 Symp. on Compiler Construction, pages 11–16, June 1986, published as SIGPLAN Notices Vol. 21, No. 7, also deals with register allocation. The PL.8 compiler, Auslander, M. and Hopkins, M., "An Overview of the PL.8 Compiler", Proc. SIGPLAN'82 Symp. on Compiler Construction, pages 22–31, June 1982, published as SIGPLAN Notices Vol. 17, No. 6, performs instruction scheduling between two register allocation phases. The approaches of Gibbons et al. and Auslander et al. obviate the need for the scheduler to explicitly deal with constraints introduced by register allocation, other than those encoded into the input DAG.

The Warren heuristic, Warren, H., "Instruction Scheduling for the IBM RISC System/6000 Processor", IBM J. Research and Development, pages 85–92, 1990, which was implemented on the "IBM RISC SYSTEM/6000", ("IBM" and "RISC SYSTEM/6000 are registered trademarks of International Business Machines Corporation.) does greedy scheduling on a prioritized list. Since the Warren heuristic targets both fixed and floating point processors, the heuristic constructs a schedule for a version of the assigned machine scheduling problem. (For example, see Bernstein, D. and Rodeh, M., "Global Instruction Scheduling for Superscalar Machines", SIGPLAN91, pages 241–255, 1991.).

Beyond Basic Blocks

An approach to increasing the scope of instruction schedules beyond basic blocks is to utilize what would otherwise be idle cycles to precompute results, where an idle cycle is one in which a functional unit has no assigned work. This can be done by moving an instruction from a later basic block in the schedule into an idle cycle, so long as executing that instruction earlier has no side effects.

Alternatively, because it's a problem to keep track of instructions from both branches, the compiler can guess which branch of the conditional will be taken. It can then move instructions from that branch that have no side effect into idle cycles that precede the conditional. Such a speculative move is discussed in Bernstein et al. If the compiler guesses correctly, then the idle cycles will have been put to good use.

A different strategy for scheduling across basic blocks involves trace scheduling, Fisher, J. A., "Trace scheduling: A technique for global microcode compaction", IEEE Trans. on Computers, C-30(7):478–490, July 1981. Trace scheduling uses profiling to compute the path through the program graph that is most likely to be taken, and then optimizes for that path.

The prior art approaches above have failed to exploit the scheduling of both instructions and idle slots from multiple basic blocks in the presence of hardware lookahead.

Thus, existing methods provide no method of, or apparatus for, scheduling of both instructions and idle slots from multiple basic blocks in the presence of hardware lookahead. As such, there is a need for a method of, and apparatus for, providing scheduling of both instructions and idle slots from multiple basic blocks in the presence of hardware lookahead.

SUMMARY OF THE INVENTION

All modern processor architectures include some degree of hardware instruction lookahead to support out-of-order instruction dispatch, issue and execution. Instruction lookahead works well in conjunction with hardware branch prediction which enables the lookahead window to be filled with instructions from the basic block that is predicted to be executed next. Instruction lookahead is essential for supporting the increasing levels of instruction-level parallelism present in modem processor architectures (e.g., in the form of multiple pipeline stages or multiple functional units). A simple abstraction of instruction lookahead can be modeled by a lookahead buffer or a lookahead window, capable of storing a fixed number of instructions that can be issued and executed out of order as they become ready for execution. The window moves ahead only when the first instruction in the window has been issued/dispatched.

Past work has focused on exploiting instruction lookahead in the context of scheduling instructions in branch delay slots. The present invention targets a more general lookahead model that is present in modem processors, a lookahead buffer rather than just delay slots in branch instructions. Hardware instruction lookahead does not offer any lookahead advantage over software when scheduling instructions within a single basic block; in this case, the compiler can essentially schedule instructions with complete lookahead. However, hardware instruction lookahead does have an advantage in performance and in safety when scheduling instructions from multiple basic blocks in the presence of statically unpredictable branches. The goal of the present invention's instruction scheduling method is to rearrange instructions within each basic block so that the overall completion time in the presence of hardware instruction lookahead is minimized. The method preserves safety by not moving any instructions beyond basic block boundaries.

The invention disclosed herein comprises a method of, a system for, and an article of manufacture for causing, scheduling instructions for execution by a computer system having hardware lookahead.

In accordance with one aspect of this invention, an idle slot is delayed, or rescheduled later in an instruction schedule.

In accordance with another aspect of this invention, an idle slot in an instruction schedule is identified, and the identified idle slot is rescheduled later in the instruction schedule.

In accordance with another aspect of this invention, a first instruction schedule is evaluated to determine if it may be rescheduled into a second instruction schedule for the same basic block in which an identified idle slot is scheduled later than in the first instruction schedule.

In accordance with another aspect of this invention, the evaluation of the rescheduling of a first instruction schedule is based on determining a completion time of instructions of the first instruction schedule, decreasing the completion time of a subset of these instructions, and determining the rescheduled second instruction schedule based on the decreased completion time.

In accordance with another aspect of this invention, the evaluation of the rescheduling of a first instruction schedule is based on computing a rank of each node of a directed acyclic graph corresponding to the first basic block of instructions, constructing an ordered list of the directed acyclic graph nodes in nondecreasing rank order, and applying a greedy scheduling heuristic to the ordered list.

In accordance with another aspect of this invention, an instruction in a second subsequent basic block of instructions is rescheduled to execute in a rescheduled idle slot in a schedule for a first basic block of instructions.

The present invention has the advantage of providing improved instruction scheduling.

The present invention has the further advantage of rearranging instructions within each basic block to reduce the overall completion time in the presence of hardware instruction lookahead.

The present invention has the further advantage of preserving safety by not moving any instructions beyond basic block boundaries.

The present invention has the further advantage of providing a heuristic for a given lookahead window size and arbitrary latencies.

The present invention has the further advantage of providing an instruction schedule for a basic block of instructions in which idle slots are delayed later in the schedule.

The present invention has the further advantage of providing improved instruction scheduling when an instruction trace is not known.

The present invention has the further advantage of providing improved instruction scheduling even when an instruction trace prediction does not match a dynamic execution sequence.

The present invention has the further advantage of facilitating the movement of instructions from a subsequent basic block into the idle slots of a prior basic block, by moving the idle slots of the prior basic block as late as possible.

The present invention has the further advantage of providing improved instruction scheduling for multiple functional units in the presence of hardware lookahead.

BRIEF DESCRIPTION OF THE DRAWINGS

For a more complete understanding of the present invention and the advantages thereof, reference is now made to the Detailed Description in conjunction with the attached Drawings, in which.

DESCRIPTION OF THE PREFERRED EMBODIMENT

Instruction Lookahead Model

Figure 1:
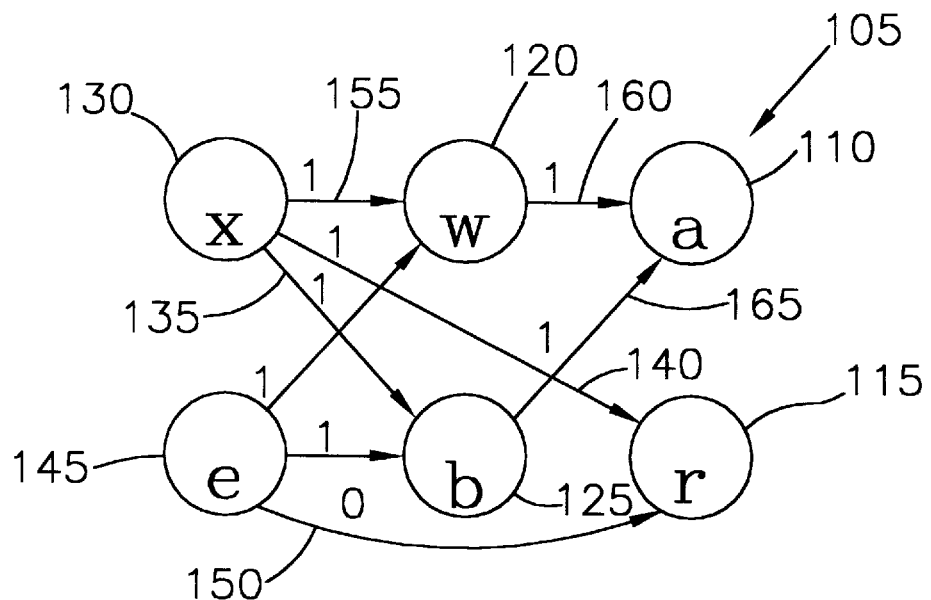
FIG. 1 shows a Directed Acyclic Graph (DAG) that represents a first basic block.

A simple model for instruction lookahead is as follows. Let W be the size of the lookahead window. Typical values for W in modern processors are in the range of 2–6. At any given instant, the window contains a sequence of W instructions, say $i_n, \ldots, i_{n+W-1}$ that occur contiguously in the program's dynamic instruction stream. The processor hardware is capable of issuing and executing any of these W instructions in the window that is ready for execution. The window moves ahead only when the first instruction in the window ($i_n$) has been issued.

The present invention addresses the problem of instruction scheduling performed by the compiler in the presence of hardware instruction lookahead. A polynomial time method is presented that computes schedules for any given lookahead window size. This method may be used as a heuristic for arbitrary latencies, as the problem of computing a minimum completion time schedule in polynomial time for arbitrary latencies is NP-hard for a single basic block, even in the absence of instruction lookahead.

An auxiliary result of the present invention is a modification of the Rank Method from Palem et al. so as to guarantee that an optimal single basic block schedule for instructions with 0/1 latencies is selected in which the idle slots occur as late as possible; this modification exploits the ability of the method from Palem et al. to handle deadlines. The Rank Method constructs a minimum completion time schedule for scheduling unit time instructions with latencies of 0 or 1 within a single basic block on a single functional unit. The Rank Method may be generalized as a heuristic method to deal with instructions that require more than a single unit of time, latencies that can exceed 1, and multiple assigned functional units. Finally, the present invention has applicability even if a trace is not known or the predicted trace is not taken. This is because by moving the idle slots as late as possible in each basic block, the present invention facilitates the movement of instructions from the basic block that does follow dynamically into the idle slots via the hardware lookahead window.

A Basic Block Example

An overview of the present invention applied to two basic blocks illustrating the rescheduling of an idle slot will now be presented. Consider an example directed acyclic graph (DAG), generally referred to as 105, shown in FIG. 1. Assume there is a single processor, and that the edges of the DAG have latencies of either 0 or 1. How the instructions in this DAG are scheduled by the Rank Method of Palem et al. will now be described. A schedule S assigns each instruction x a start time S(x) and a functional unit on which to run. For the single functional unit case, the functional unit assignment may be ignored. Assume that each start time has an integer value. A functional unit has an idle slot at some integer value t, where t is less than the completion time of S, if that functional unit is not starting or running any instruction at time t. The deadline of instruction x, written d(x), is the latest time at which x can be completed in any feasible schedule, where a feasible schedule is one in which every instruction completes by its deadline rank(x), is an upper bound on the completion time of x if x and all of the successors of x are to complete by their deadlines. Each node initially may be assigned an artificial deadline which is a large number relative to the problem size that will not introduce any additional constraints into the problem, say 1000. Since this implies that every node must be completed by time 1000, all nodes are given an initial rank of 1000. As more information is obtained about a node, the value of its rank is decreased accordingly. The Rank Method executes the following steps: compute the ranks of all the nodes; construct an ordered list of nodes in nondecreasing order of their ranks; and apply a greedy scheduling procedure to the ordered list of nodes.

If the schedule for DAG 105 is to be completed by 1000, instructions a 110 and r 115 must complete no later than 1000. Since edge (w,a) 160 and edge (b,a) 165 both have latencies of 1, then instructions w 120 and b 125 must complete no later than 998. Instruction x 130 has nodes w 120, b 125, a 110, and r 115 as descendants. Therefore, x 130 must complete sufficiently early to allow all of its descendents to complete by their ranks.

To determine rank(x), backward scheduling is performed on all of the descendents of x 130, starting with the descendents that are the farthest distance from x 130. Backward scheduling is an internal step in the Rank Method, and is different from the greedy scheduling method. In this case, 3 units of time must elapse between when x 130 completes and a 110 begins (latency 1 edge (x,w) 155 followed by node w 120 followed by the latency 1 edge (w,a) 160). But only 1 unit of time must elapse between the completion of x 130 and the start of any of its other descendents (latency 1 edges l(x,b) 135, (x,r) 140, and (x,w) 155). So a 110 is selected as the first node to be inserted in the backward schedule, and a 110 is placed at the latest possible time so that a 110 will complete by its rank. In this example, a 110 is started at time 999. It is also possible to start r 115 at time 999, but since a 110 is already started at that time, instead r 115 is started at time 998. w 120 may then be started at 997, since rank(w)=998, and b 125 at 996. Since there is a latency 1 edge (x, b) 135 from x 130 to b 125, x 130 cannot be completed later than 995, which implies that rank(x)=995. Next rank(e) is computed. Although x 130 has a latency 1 edge (x,l) 140 to r 115 while e 145 has only a latency 0 edge (e,r) 150 to r 115, the rank computation for e 145 will be identical to that of x 130 with r 115 being placed at the latest possible time in the backschedule, independent of the latency 0 edge 150 between e 150 and r 115.

The result of the backscheduling is that rank(x)=rank(e) =995, rank(w)=rank(b)=998, and rank(a)=rank(r)=1000. A totally ordered list is then constructed in order of rank, going from small to large.

Assume that the ordered list computed in order of ranks is: e 145, x 130, b 125, w 120, a 110, r 115. The greedy procedure will schedule e 145 followed by x 130. But then there has to be an idle slot, since all the unscheduled nodes are descendents of x 130, and all of x's descendents (b 125, r 115, and w 120 ) have latency 1 edges (135, 140, and 155) with x 130. Then b 125 is scheduled, immediately followed by w 120. Even though a 110 is the next node on the list, a 110 cannot be scheduled immediately after w 120 because of the latency 1 edge 160 between them. But r 115 may be scheduled immediately after w 120. This yields the schedule, generally referred to as 205, as shown in FIG. 2.

This schedule 205 comprises seven slots: the first slot 210 starting at time 0 and ending at time 1, the second slot 215 starting at time 1 and ending at time 2, the third slot 220 starting at time 2 and ending at time 3, the fourth slot 225 starting at time 3 and ending at time 4, the fifth slot 230 starting at time 4 and ending at time 5, the sixth slot 235 starting at time 5 and ending at time 6, and the seventh slot 240 starting at time 6 and ending at time 7. Within this schedule 205, the instructions of DAG 105 are scheduled as follows: instruction e 145 in the first slot 210; instruction x 130 in the second slot 215; instruction b 125 in the fourth slot 225; instruction w 120 in the fifth slot 230; instruction r 115 in the sixth slot 235; and instruction a 110 in the seventh slot 240. In this schedule 205, the third slot 220 is an idle slot which does not contain a scheduled instruction.

Moving An Idle Slot

Figure 2:
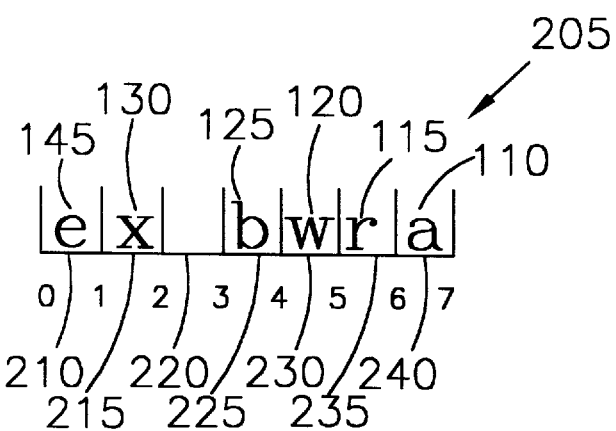
FIG. 2 shows a minimum completion time schedule for the DAG of FIG. 1.

Continuing with the example of FIG. 1, observe that the minimum completion time schedule 205 given in FIG. 2 has a completion time of 7. Reducing the deadlines and ranks of all the nodes of the basic block by 1000–7=993, yields rank(x)=rank(e)=2, rank(w)=rank(b)=5, rank(a)=rank(r)=7. After reducing the ranks, note that all nodes complete by their ranks, that the last node, a 110 in the seventh slot 240, completes precisely at its rank of 7, and that x 130, the node immediately preceding the idle slot 220, also completes at its rank of 2.

Figure 3:
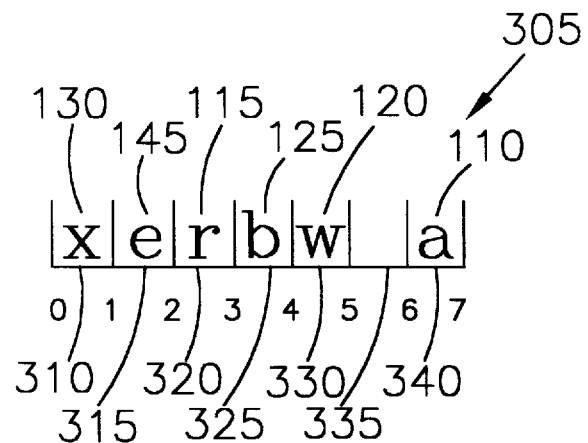
FIG. 3 shows a second minimum completion time schedule for the DAG of FIG. 1 in which the idle slot has been delayed.

Since x 130 is a predecessor of all the nodes that follow it in the schedule 205, and since there are latency 1 edges (135, 140, and 155) from x 130 to all its descendents (115, 120, and 125), the idle slot 220 could be moved to a later time without increasing the completion time of the schedule only if x 130 is started earlier. Applying the present invention, setting deadline d(x)=rank(x)=1, and recomputing the ranks of all predecessors of x (in this case, x has no predecessors), yields the schedule, generally referred to as 305, shown in FIG. 3.

This schedule 305 also comprises seven slots: the first slot 310 starting at time 0 and ending at time 1, the second slot 315 starting at time 1 and ending at time 2, the third slot 320 starting at time 2 and ending at time 3, the fourth slot 325 starting at time 3 and ending at time 4, the fifth slot 330 starting at time 4 and ending at time 5, the sixth slot 335 starting at time 5 and ending at time 6, and the seventh slot 340 starting at time 6 and ending at time 7. Within this schedule 305, the instructions of DAG 105 are scheduled as follows: instruction x 130 in the first slot 310; instruction e 145 in the second slot 315; instruction r 115 in the third slot 320; instruction b 125 in the fourth slot 325; instruction w 120 in the fifth slot 330; and instruction a 110 in the seventh slot 340. In this schedule 305, the sixth slot 335 is the idle slot which does not contain a scheduled instruction.

Note that this schedule 305 also completes at time 7, the same time as schedule 205, but that the idle slot 335 has been delayed and rescheduled to a later time in the schedule, in the sixth slot 335 instead of the third slot 220. By moving the idle slot later in the schedule 305, the present invention facilitates the movement of an instruction from the next basic block following basic block 105.

Combining Basic Blocks

Figure 4:
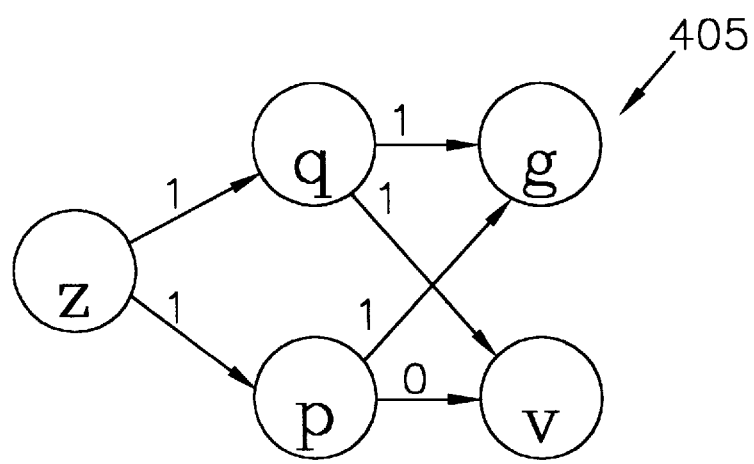
FIG. 4 shows a DAG for a second basic block.
Figure 5:
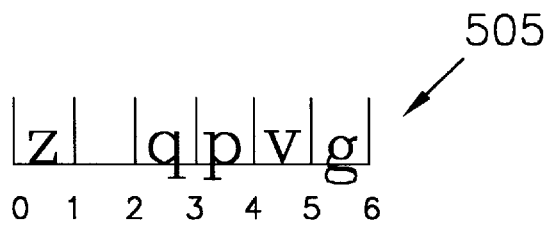
FIG. 5 shows a minimum completion time schedule for the DAG of FIG. 4.
Figure 6:
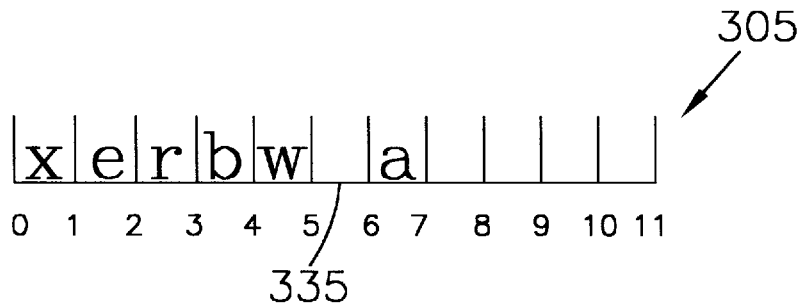
FIG. 6 shows a minimum completion time schedule for a lookahead window of size two for the basic blocks of FIG. 1 and FIG. 4 produced by the practice of the present invention, assuming that there are no dependencies between the basic blocks.
Figure 6:
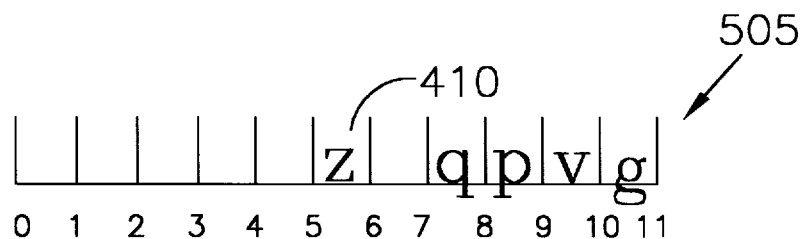
Figure 6:
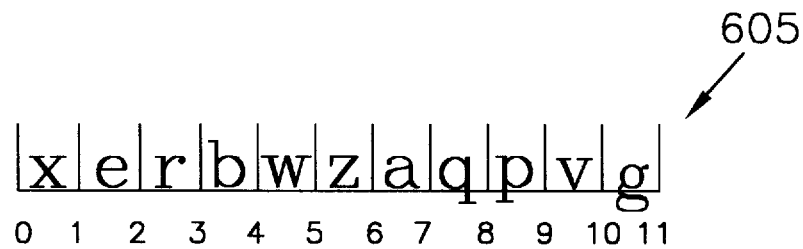
Figure 7:
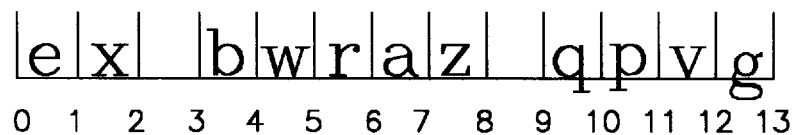
FIG. 7 shows a schedule for the basic blocks of FIG. 1 and FIG. 4 produced by the prior art with a lookahead window of size two without the practice of the present invention.

Combining two basic blocks will now be illustrated. Let the DAG 105 of FIG. 1 be a first basic block of instructions $BB_1$ 105, and let the DAG 405 of FIG. 4 be a second subsequent basic block of instructions $BB_2$ 405. Applying the present invention to the DAG 405, then the schedule 505 of FIG. 5 is produced. If there are no edges from the nodes of $BB_1$ 105 to those of $BB_2$ 405 and if the lookahead window has a size of two, then the two schedules 305 and 505 may be combined with the aid of a hardware lookahead window into schedule 605 of FIG. 6. In the combined schedule 605, the hardware lookahead window has moved the first instruction z 410 of schedule 505 into the idle slot 335 of schedule 305, thus decreasing the overall execution time to 11 execution cycles from 13 execution cycles. Such a 13 execution cycle schedule produced by the prior art is illustrated in FIG. 7.

The Second Basic Block

Figure 8:
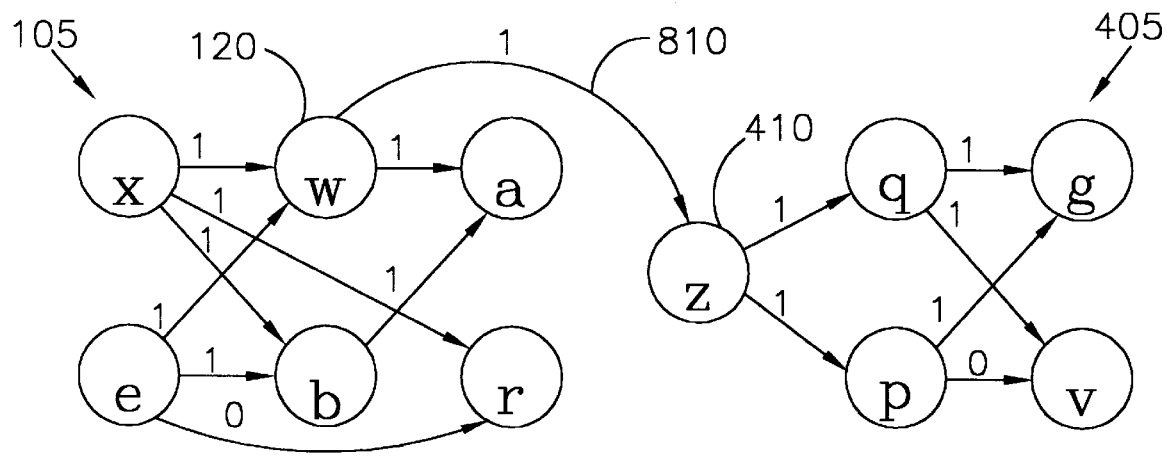
FIG. 8 shows a DAG of the basic blocks from FIG. 1 and FIG. 4 in which there is a dependence from instruction w of the first basic block to instruction z of the second basic block.

Referring now to FIG. 8, assume there is a latency 1 edge 810 from node w 120 of DAG 105 to node z 410 of DAG 405. In this case, z 410 cannot start until at least two units after w 120 has been started. In the schedule of FIG. 6 for DAG 105 and DAG 405, for example, since there are no dependences across the basic blocks, node b 125 is scheduled at time 3 and node w 120 is scheduled at time 4. However, because of the latency 1 edge 810 from w 120 to z 410, node z 410 cannot be scheduled at time 5. This example illustrates how dependences between basic blocks as well as the size of the lookahead window should be considered when computing a schedule for consecutive basic blocks. In other words, moving an idle slot from a position prior to a lookahead window into the lookahead window will not increase the overall completion time for a schedule of a trace of at least two basic blocks for 0/1 latencies (and is unlikely to increase the overall completion time when used as a heuristic for larger latencies). This example illustrates how dependencies between basic blocks may impact schedules, and also how moving idle slots into the window may cause increased completion time.

When there are edges that run from one basic block to the next, the nodes in the second basic block might impact the start times of the nodes in the first basic block. To determine if this is the case, both basic blocks are first scheduled together with no constraints on the location of the $BB_1$ nodes. Assume for this example that every node in $BB_1 \cup BB_2$ is given a deadline of 1000. The rank computation then gives the following values:

rank(g)=rank(v)=rank(a)=rank(r)=1000
rank(p)=rank(b)=998
rank(q)=997
rank(z)=995
rank(w)=993
rank(e)=991
rank(x)=990

The ordered list consists of: x, e, w, z, q, p, b, v, a, r, g.

Figure 9:
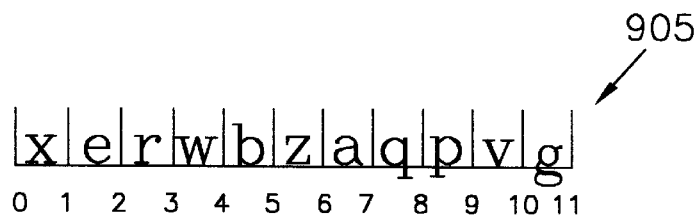
FIG. 9 shows a minimum completion time schedule for a lookahead window of size two produced by the practice of the present invention for the DAG of FIG. 8.

The schedule that will be constructed from the ordered list is given in FIG. 9. All the $BB_1$ nodes are completed within the first 7 time units, and only one $BB_2$ node (node z), corresponding to the one idle slot in the schedule of $BB_1$, is scheduled prior to the last $BB_1$ node. Furthermore, this is the schedule that would be executed by a machine with a hardware lookahead window of size 2 if the instructions in basic block 1 are ordered x, e, r, w, b, a, and the instructions in basic block 2 are ordered z, q, p, v, g.

However, in general the Rank Method computation described for a pair of basic blocks cannot guarantee that an acceptable schedule can always be executed by the lookahead hardware. A schedule S with permutation P is said to be acceptable if it satisfies all data dependencies and the following two constraints:

Window Constraint: for every inversion (i,j) in P, (j−i+1) is less than or equal to W, the size of the lookahead window; and Ordering Constraint: S is obtainable as a greedy schedule from priority list $L = P_1 o\ P_2 o \ldots P_m$, where o denotes list concatenation;

where (i,j) is said to be an inversion in permutation P if i<j, and if the ith instruction in P belongs to a later basic block than the jth instruction in P.

The Window Constraint enforces a bounded lookahead window size. The Ordering Constraint models the hardware property of not issuing a later instruction in the lookahead window that's ready to execute before an earlier instruction that's ready to execute.

If, for example, there had been a latency 0 edge from z to q, the procedure would have scheduled q immediately after z, instead of scheduling a at that time. Such a schedule could not have been constructed by hardware with a lookahead window size of 2. Therefore, after first determining a lower bound on the completion time of an acceptable schedule for $BB_1 \cup BB_2$, which in this case is 11, all $BB_1$ nodes are given deadlines that correspond to the minimum completion time for $BB_1$ alone, which in this case is 7. The only exception is if the procedure has already determined that some node must have a smaller deadline, as is the case for x, which has d(x)=1. The smaller deadlines are retained.

All $BB_2$ nodes are given the deadline that is equal to the completion time of the merged schedule, in this case 11. Then the ranks of all nodes in $BB_1 \cup BB_2$ are computed. The Rank Method is called to determine if there exists a schedule which satisfies all the deadlines. If Rank Method fails to construct a schedule, the deadlines assigned to the $BB_2$ nodes are increased until the minimum value is found for which a feasible schedule may be constructed. This step is required to construct a schedule that can actually be executed by the lookahead hardware.

Partitioning a Schedule

An idle interval is one or more consecutive idle slots. A greedy schedule can contain an idle interval with k idle slots only if there are latencies of size at least k. An idle interval with k consecutive idle slots is known as a k-idle interval. First assume single functional unit schedule S has j idle intervals starting at times $t_1, t_2, \ldots, t_j$, with $t_1 < t_2 < \ldots < t_j$. S may be partitioned into j+1 σ sets, $\sigma_1, \sigma_2, \ldots, \sigma_{j+1}$, where $\sigma_1$ consists of all the nodes scheduled in S prior to $t_1$, and $\sigma_p 1 < i \leq j$, consists of all the nodes scheduled in S after $t_{i-1}$, and before $t_i$; and $\sigma_{j+1}$ is all the nodes scheduled after $t_j$. The partitioning P of S is the collection of σ sets. Each σ set except for $\sigma_{j+1}$ terminates at an idle slot. For $\sigma_p i \leq j$, define $tail_i$ to be the node scheduled in S at time $t_i - 1$, i.e. just prior to the idle interval. For convenience, $a_i = tail_i$ is written as a notational abbreviation. Suppose a multiple functional unit schedule S has idle intervals starting at times $t_1, t_2, \ldots, t_j$, the σ sets of a partitioning P can be defined as follows: $\sigma_1$ consists of all the instructions scheduled or started prior to $t_1$, $\sigma_1$ consists of all the instructions scheduled or started at or later than $t_1$ and prior to $t_2, \ldots$

Moving The Idle Slots

The Rank Method computes ranks of nodes by initially assigning all nodes some deadline D, where D is sufficiently large that it's guaranteed not to interfere with the ordering determined by the Rank Method. Let BB be a basic block, and assume that schedule $S_0$ with completion time t is constructed for BB using the Rank Method. The ranks assigned to the nodes in BB are modified by decrementing every deadline, and consequently every rank, by D−T. One effect of this modification is to give all sink nodes a rank of T, where a sink node is a node that has no descendents. If S is a schedule constructed by the Rank Method, $N_S$ is defined to be the nodes in S, $E_S$ to be the edges between nodes in $N_S$ and $d_S$ to be the deadlines of the nodes in S.

Assume that there is at least one idle slot in $S_0$, and let the start times of the idle slots be $t_1, t_2, \ldots, t_k$, with $t_1 < t_2 < \ldots < t_k$. Procedure Move_Idle_Slot is called to try to move the ith idle slot of schedule S so that it starts at a later time. If it is not possible to move the ith idle slot to a later time, Procedure Move_Idle_Slot returns the input schedule S and the input time $t_1$. If it is possible to move the ith idle slot later, then Procedure Move_Idle_Slot returns a modified schedule S' and $t'_i$, the new start time of the ith idle slot, with $t'_i > t_i$.

Scheduling Multiple Basic Blocks with Hardware Lookahead

The following sections first describe applying the present invention to a single functional unit with 0/1 latencies (section entitled "The General Method"), and then discuss more specifically how to apply the present invention to a general machine model (section entitled "Applying the Method to the Multiple Functional Unit Problem").

The General Method

Let $BB_1, BB_2, \ldots, BB_m$ be the basic blocks in the input trace, and let W be the size of the window, i.e., the lookahead mechanism can consider W consecutive nodes in the schedule. The Lookahead Method first constructs minimum completion time schedule $S_1$ for $BB_1$ in which the idle slots are as late as possible, using Procedure Move_Idle_Slot. The lookahead hardware may then schedule $BB_2$ nodes only in the idle slots that occur within the last W instructions/nodes in $S_1$. Therefore, if there is an idle slot in $S_1$ that occurs prior to the last W nodes scheduled in $S_1$, $S_1$ is divided into $S_1^-$ and $S_1^+$ where $S_1^-$ is the prefix of $S_1$ up to the occurrence of the last idle slot prior to the last W nodes in $S_1$, and $S_1^+$ is the rest of $S_1$. If there is no idle slot in $S_1$, then since there can be latencies between $BB_1$ and $BB_2$ nodes that could create unnecessary idle slots between the last $BB_1$ node and the first $BB_2$ node, all of $BB_1$ is retained. In this case $S_1^- = \phi$ (the empty set) and $S_1^+ = S_1$. $BB_1^-$ is defined to be the nodes in $S_1^-$ and $BB_1^+$ the nodes in $S_1^+$. $S_1^-$ is not modified further by the scheduling method and can be output at this time.

Since deadlines are used to move the idle slots as late as possible, if $S_1^- \neq \phi$, next all deadlines in $S_1^+$ are decremented by an amount which is equal to the length of $S_1^-$ plus one for the idle slot. $BB_1^+ \cup BB_2$ is then scheduled using the Rank Method.

If there are no dependencies from $BB_1^+$ to $BB_2$ or if the total number of nodes in $BB_1^+ \cup BB_2$ is no greater than W, then $d(x)$ is set to $\min\{d(x), T_1^+\}$ for each x in $BB_1^+$, where $d(x)$ is the old deadline of x (possibly a deadline that has been decremented in Procedure Move_Idle_Slot) and $T_1^+$ is the makespan or completion time of $S_1^+$. All $BB_2$ nodes are given initial deadlines of some large deadline D. The deadlines for $BB_1^+$ insure that the schedules for $BB_1^-$ and $BB_1^+$ together form an acceptable schedule for $BB_1$; the only difference is that some idle slots in the schedule for $BB_1$ may now be occupied by instructions from $BB_2$. $BB_1^+ \cup BB_2$ is then scheduled with the new deadlines using the Rank Method.

If there are dependencies from $BB_1^+$ to $BB_2$ and if the number of nodes in $BB_1^+ \cup BB_2$ is greater than W, it may be necessary to reorder some of the $BB_1^+$ nodes in order to allow the $BB_2$ nodes to fill the $S_1^+$ idle slots. Therefore, a minimum completion time schedule $S_{1,2}$ is initially computed for $BB_1^+ \cup BB_2$ with completion time $T_{1,2}$ in which all nodes in $BB_1^+ \cup BB_2$ are given the same large deadline D. $T_{1,2}$ is a lower bound on the minimum completion time of a schedule for $BB_1^+ \cup BB_2$ that satisfies the window constraint. All nodes $BB_2$ are then assigned a deadline of $T_{1,2}$. Also $d(x)$ is set to $\min\{d(x), T_1^+\}$ for each x in $BB_1^+$, where $d(x)$ is the old deadline of x.

The method next computes the ranks using the newly assigned deadlines. If Rank Method fails to compute a schedule using the new deadlines, the deadlines of all $BB_2$ nodes are increased by the minimum amount that will result in the construction of a schedule that satisfies all of the deadlines. Those skilled in the art recognize that scheduling methods other than Rank Method may be used, so long as the scheduling method depends upon deadlines. There is a feasible, if not necessarily minimum completion time, schedule that can be obtained by first scheduling all of the $BB_1^+$ nodes followed by all of the $BB_2$ nodes, with possibly some idle time (one unit of idle time in the 0/1 latency case) between the two. Therefore, the number of iterations required for this portion of the method is going to be no greater than log W in the worst case if binary search is used. Since W is small in practice and by assumption no greater than the number of nodes in $BB_1^+ \cup BB_2$, this portion of the method does not affect the fact that the method runs in polynomial time.

The output schedule separates $BB_1$ from $BB_2$; the overlap among their instructions only occurs in the lookahead window at runtime.

In general, if schedule $S_i$, has been constructed, it is divided as described above. $S_i^-$ is concatenated to the portion of the schedule that has been previously output using concat. The deadlines of the nodes in $S_i^+$ are modified, i.e., the nodes in $BB_i^+$ are modified, and then $BB_i^+ \cup BB_{i+1}$ is scheduled.

Referring next to FIG. 10 through FIG. 14, flowcharts illustrating operations preferred in carrying out the present invention are shown. In the flowcharts, the graphical conventions of a diamond for a test or decision and a rectangle for a process or finction are used. These conventions are well understood by those skilled in the art, and the flowchart is sufficient to enable one of ordinary skill to write code in any suitable computer programming language.

Figure 11:
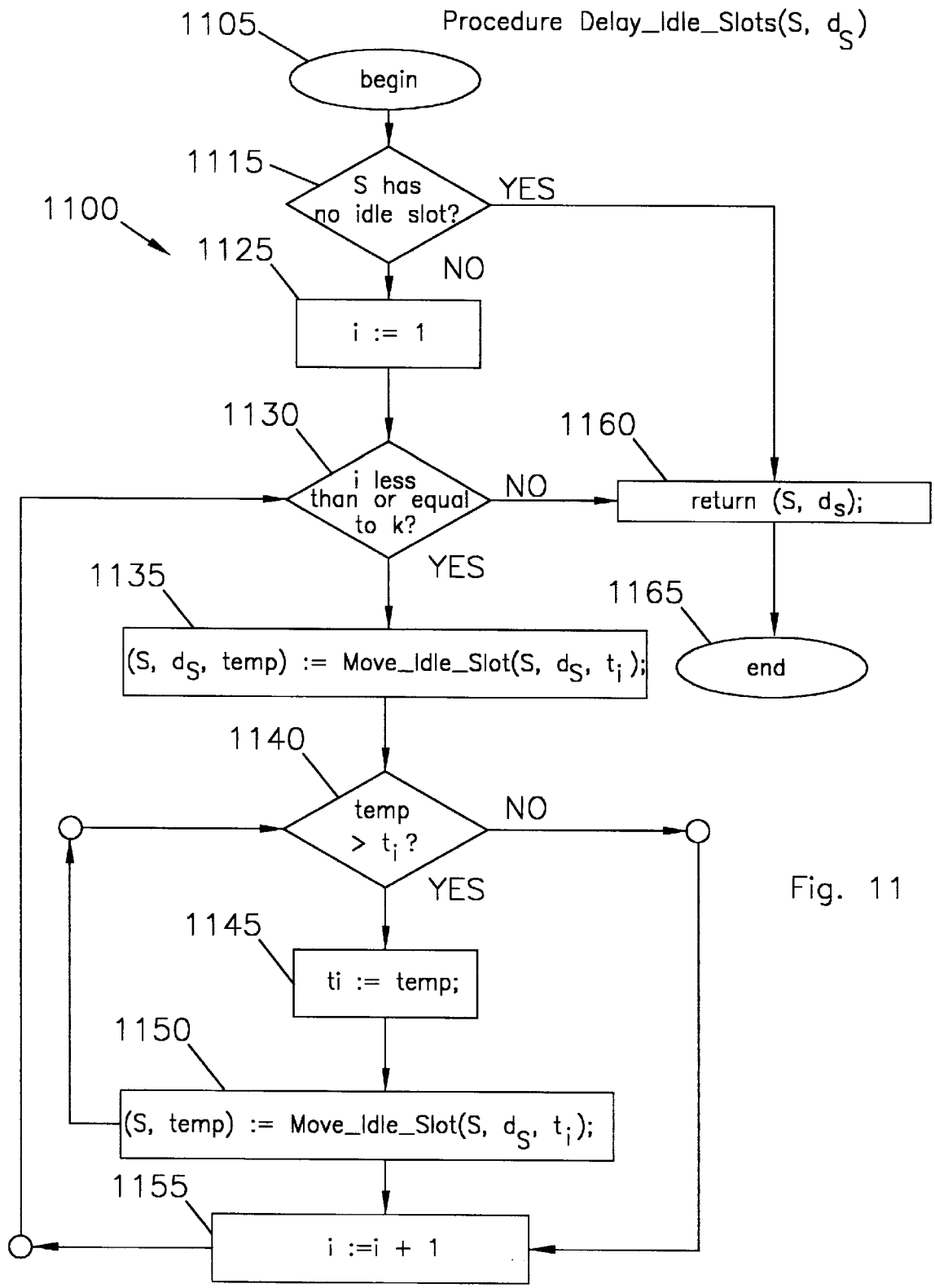
FIG. 11 is a flowchart illustrating the operations preferred in carrying out the Procedure Delay_Idle_Slots portion of the present invention.
Figure 12:
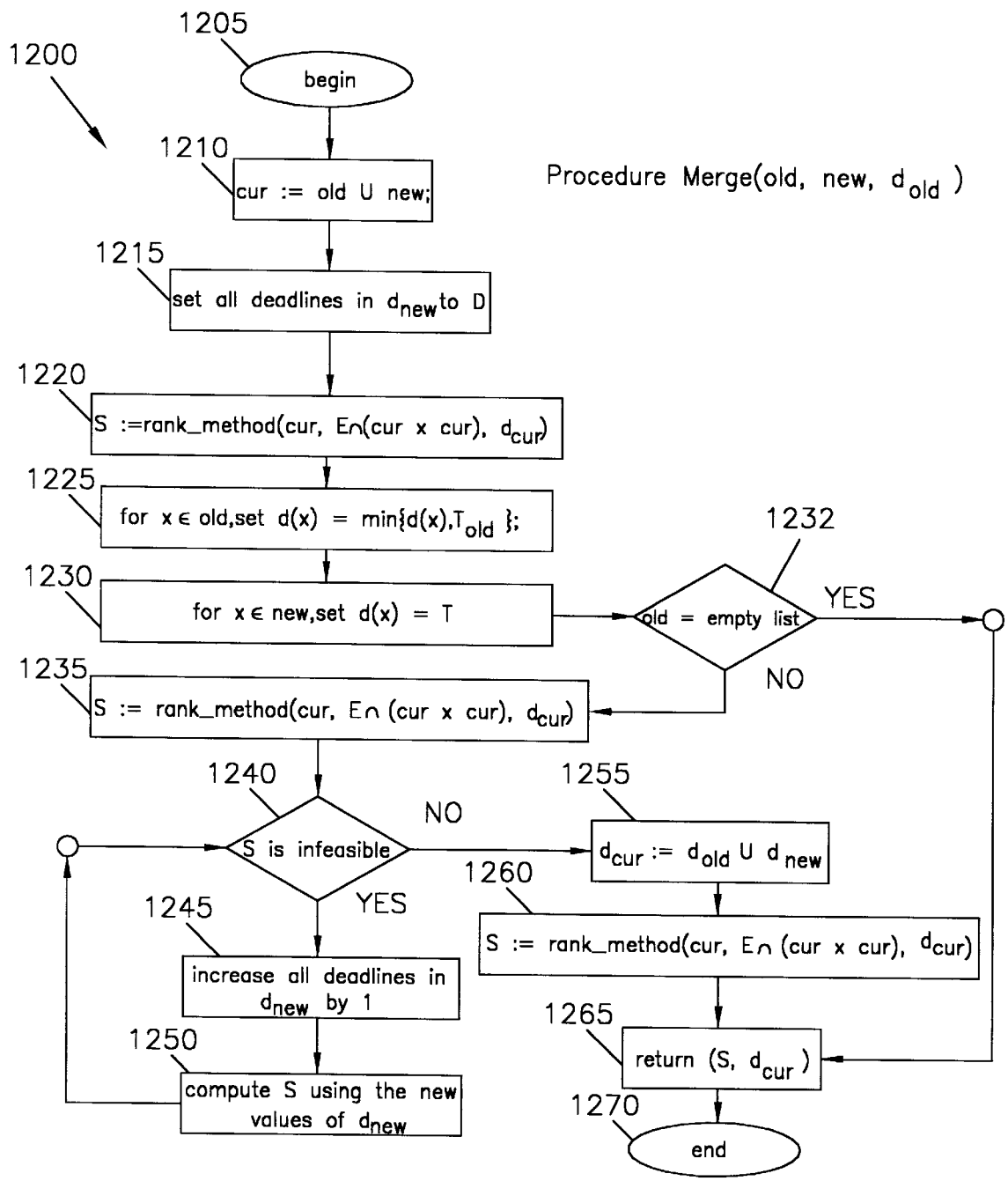
FIG. 12 is a flowchart illustrating the operations preferred in carrying out the Procedure Merge portion of the present invention.

The operations preferred in carrying out the present invention may be implemented as six routines or programs comprising a Procedure Lookahead, a Procedure Delay_Idle_Slots, a Procedure Merge, a Procedure Chop, a Procedure Move_Idle_Slot, and a Procedure Rank_Method. The Procedure Lookahead, illustrated in FIG. 10, iterates over an ordered list of basic blocks from an input trace to produce a schedule of instructions. The Procedure Merge, illustrated in FIG. 12, is called by Procedure Lookahead to produce a schedule for the merger of instructions from a previous basic block and a current basic block. The Procedure Delay_Idle_Slots, illustrated in FIG. 11, is called by Procedure Lookahead to delay idle slots in a schedule as far as possible. The Procedure Chop, illustrated in FIG. 13, called by Procedure Lookahead chops a schedule into a prefix schedule prior to an idle slot and a subsequent suffix schedule. The Procedure Move_Idle_Slot, illustrated in FIG. 14, is called by Procedure Delay_Idle_Slots to move an idle slot in a schedule. Procedure Rank_Method, described in Palem et al. which is incorporated herein by reference, is called by Procedure Move_Idle_Slot and Procedure Merge to produce instruction schedules.

Figure 10:
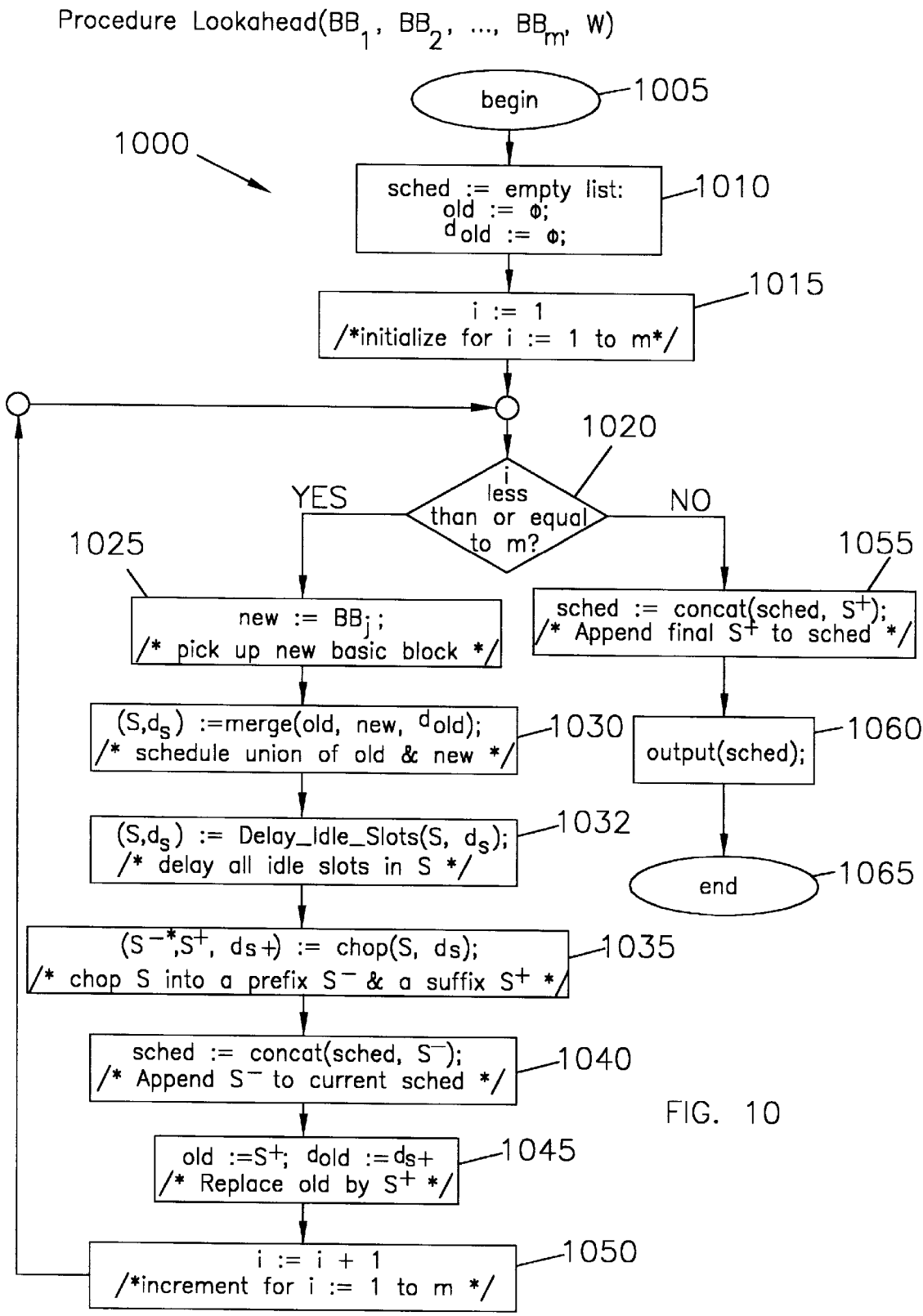
FIG. 10 is a flowchart illustrating the operations preferred in carrying out the Procedure Lookahead portion of the present invention.

Referring next to FIG. 10, the operations preferred in carrying out the Procedure Lookahead portion of the present invention are shown. Procedure Lookahead comprises a for-loop which iterates over the basic blocks of an input trace, and has the following invariants:

sched is the partial schedule (permutation) built so far;

old is the set of instructions from previous basic blocks that still need to be scheduled; and new is the set of new instructions from the current basic block, $BB_i$.

The first major step in the for-loop is to call Procedure Merge, which returns a schedule S for instructions in the union of old and new. Procedure Merge assigns deadlines to instructions in old to ensure that instructions from new do not displace instructions in old, but only fill idle slots that may be present among instructions in old The next step is to delay all idle slots in S as far as possible by calling Procedure Delay_Idle_Slot, which repeatedly calls Procedure Move_Idle_Slot.

The final major step in the for-loop is to "chop" schedule S into $S^-$ and $S^+$, where $S^-$ is the prefix of S up to the occurrence of the last idle slot prior to the last W nodes in S, and $S^+$ is the rest of S. If there is no idle slot in S, then since there may be dependence edges with non-zero latencies between old and new nodes that could create unnecessary idle slots between the last old node and the first new node, all of old is retained. In this case $S^-$=empty set and $S^+$=S. If S has fewer than W nodes, then $S^-$ is set to the empty set and $S^+$=$S_1$. Since deadlines are used to move the idle slots as late as possible, if $S^-$ is not equal to the empty set, next all deadlines and ranks in $S^+$ are decremented by $t_j+1$, which is equal to the length of $S^-$ plus one for the idle slot.

Referring now to FIG. 10, the Procedure Lookahead process begins at process block 1005. Thereafter, process block 1010 and process block 1015 perform initialization for the loop comprising process blocks 1020 through 1050. Process block 1010 initializes schedule, old, and $d_{old}$ by setting them equal to the empty set, and process block 1015 sets a loop increment variable, i, equal to 1. Thereafter, decision block 1020 determines if the loop increment variable, i, is less than or equal to m, the number of input basic blocks. If i is less than or equal to m indicating that there are input basic blocks remaining to be processed by the loop, then process block 1025 picks up a next basic block by setting a variable new equal to $BB_i$. Thereafter, process block 1030 merges the old schedule, old, and the new schedule, new by calling Procedure Merge. Thereafter, process block 1032 delays all idle slots in S by calling Procedure Delay_Idle_Slots. Thereafter, process block 1035 chops the schedule, S, returned by Procedure Delay_Idle_Slots into a prefix schedule, $S^-$, and a suffix schedule, $S^+$ by calling Procedure Chop. Thereafter, process block 1040 appends the prefix schedule, $S^-$, to the current schedule, sched. Thereafter, process block 1045 replaces the old schedule, old, by the prefix schedule, $S^+$. Thereafter, process block 1050 increments the loop increment variable, i, and the process loops back to decision block 1020 to there are input basic blocks remaining to be processed by the loop.

Returning now to decision block 1020, if the loop increment variable, i, is more than m, i.e., if there are no more input basic blocks remaining to be processed by the loop, then process block 1055 appends the prefix schedule, $S^+$, to sched to produce a final schedule. Thereafter, process block 1060 outputs the final schedule, sched, and the process ends at process block 1065.

TABLE 1

| | FIG. 10 Reference Numeral |
|---|---|
| Procedure Lookahead($BB_1, BB_2, \ldots, BB_m$, w) | |
| /* $BB_1, BB_2, \ldots, BB_m$ are the input basic blocks in a trace, and $W$ is the size of the look ahead window. $N = BB_1 \cup BB_2 \ldots \cup BB_m$ is the set of all instructions, and $E \subseteq N \times N$ is the set of all dependence edges. For any subgraph $G' = (N', E')$ with node set $N' \subseteq N$, define $E' = E \cap (N' \times N')$. */ | |
| begin main; | 1005 |
|     sched := empty list; old := empty list; $d_{old}$ := empty list; /* initialize sched, old, & $d_{old}$ */ | 1010 |
|     for i := 1 to m | 1015 |
| | 1020 |
|         new := $BB_i$; /* pick up new basic block */ | 1025 |
|         /* Schedule merged instructions in old $\cup$ new and | |
|         return new schedule and deadlines in S, $d_S$. */ | |
|         (S, $d_S$) := Merge(old, new,$d_{old}$); | 1030 |
|         (S, $d_S$) := Delay_Idle_Slots(S, $d_S$) /* Delay all idle slots in S */ | 1032 |
|         ($S^-$, $S^+$, $d_{S+}$) := Chop(S,$d_S$); /*chop S into prefix $S^-$ & suffix $S^+$*/ | 1035 |
|         sched := concat(sched, $S^-$); /* Append $S^-$ to current sched */ | 1040 |
|         old := $S^+$; $d_{old}$ := $d_{S+}$; /* Replace old by $S^+$ */ | 1045 |
|     end for loop | 1050 |
|     sched := concat(sched, $S^+$);/* Append final $S^+$ to sched */ | 1055 |
|     output(sched); | 1060 |
| end main. | 1065 |

Referring next to FIG. 11, the operations preferred in carrying out the Procedure Delay_Idle_Slots portion of the present invention are shown. The process begins at process block 1105, and thereafter, decision block 1115 determines if S has no idle slot. If S has no idle slot, then process block 1160 returns (S,$d_D$) to Procedure Lookahead, and then the process ends at process block 1165.

Returning now to decision block 1115, if S has an idle slot, then S is processed by the loop comprising process blocks 1125, 1130, 1135, 1140, 1145, 1150, and 1155. Process block 1125 initializes the loop increment, process block 1155 increments the loop increment, and decision block 1130 determines if the loop increment is less than or equal to k, the number of idle slots in S. If the loop increment is less than or equal to k, then idle slots remain to be processed in S, and process block 1135 calls Procedure Move_Idle_Slot which attempts to move the ith idle slot. Thereafter, a do-while loop comprising process blocks 1140, 1145, and 1150 attempts to delay the $i^{th}$ idle slot. Decision block 1140 determines if temp is greater than $t_i$. If temp is greater than $t_i$, then process block 1145 sets $t_i$ equal to temp, and process block 1150 calls Procedure Move_Idle_Slot(S, $d_s,t_i$). Thereafter, processing loops back to decision block 1140 to determine if temp is greater than $t_i$.

Returning now to decision block 1140, if if temp is not greater than $t_i$, then process block 1155 increments the loop increment, and thereafter, processing loops back to decision block 1130 to determine if all idle slots have been processed.

Returning now to decision block 1130, if the loop increment is greater than k, then all idle slots in S have been processed, and processing continues to process block 1160 which returns (S,$d_S$) to Procedure Lookahead, and then the process ends at process block 1165.

TABLE 2

| | FIG. 11 Reference Numeral |
|---|---|
| /* Let $t_1, t_2, \ldots, t_k$ be the start times of the idle slots in S. */ | |
| Delay_Idle_Slots(S, d<sub>s</sub>) | |
| *begin;* | 1105 |
|    *if* S has no idle slot | 1115 |
|       *return* (S,d<sub>s</sub>); | 1160 |
|    *for i* := 1 *to* k /* process idle slots from earliest to latest */ | 1125 |
| | 1130 |
|       (S, d<sub>s</sub>, *temp*) := Move_Idle_Slot(S, d<sub>s</sub>, t<sub>i</sub>); | 1135 |
|       *while temp* > t<sub>i</sub> /*continue trying to move i<sup>th</sup> idle slot */ | 1140 |
|          t<sub>i</sub> := *temp*; | 1145 |
|          (S, *temp*) := Move_Idle_Slot(S, d<sub>s</sub>, t<sub>i</sub>); | 1150 |
|       *end while* | |
|    *end for* | 1155 |
| *return* (S,d<sub>s</sub>); | 1160 |
| *end* Delay_Idle_Slots | 1165 |

Referring next to FIG. 12, the operations preferred in carrying out the Procedure Merge portion of the present invention are shown. Procedure Merge works as follows. If there are dependencies from old to new, and if the number of nodes in the union of old and new is greater than W, it may be necessary to reorder some of the old nodes in order to allow the new nodes to fill idle slots. Therefore, initially a minimum makespan schedule, S, is computed for cur equal to the union of old and new with a makespan T in which all nodes in cur are given the same large deadline D. T is a lower bound on the makespan of a schedule for cur that satisfies the window constraint. For each node x in new, d(x) is set to T; for each node x in old, d(x) is set to min{d(x), $T_{old}$}, where d(x) is the old deadline of x and $T_{old}$ is the makespan for the nodes in old. The method next computes the ranks using the newly assigned deadlines. If no schedule can be constructed using the new deadlines, the deadline of all new nodes is increased by the minimum amount that will result in the construction of a feasible schedule. There is a feasible, if not necessarily minimum makespan or minimum completion time, schedule that can be obtained by first scheduling all of the old nodes followed by all of the new nodes, with possibly a unit of idle time. In the case of latencies larger than 1, the amount of idle time between the two schedules can be as much as the value of the largest latency between the two. Therefore, the number of iterations of the rank computation cannot exceed 2W(or log(W) if binary search is used).

Referring now to FIG. 12, the process begins at process block 1205, and thereafter, process block 1210 sets cur equal to the union of old and new. Process block 1215 then sets all deadlines in $d_{cur}$ to D, an artificially large deadline, and process block 1220 calls Rank_Method which returns a schedule S. Thereafter, process block 1225 sets d(x) equal to min{d(x), $T_{old}$} for x∈old, where $T_{old}$ is a completion time of the schedule for old. Process block 1230 then sets d(x) equal to T for x∈new, where T is a makespan or completion time of the schedule S. Thereafter, decision block 1232 determines if old is equal to the empty list. If old is not equal to the empty list, then process block 1235 calls Rank_Method to reschedule the nodes in cur and return a schedule S. Processing then enters a do-while loop comprising process blocks 1240, 1245, and 1250. Decision block 1240 determines if schedule S is infeasible. If schedule S is infeasible, then process block 1245 increases all deadlines in $d_{new}$ by 1, and process block 1250 computes S using the new values of $d_{new}$. Processing then loops back to decision block 1240 to determine if schedule S is infeasible.

Returning now to decision block 1240, if schedule S is feasible, then process block 1255 sets $d_{cur}$ equal to the union of $d_{old}$ and $d_{new}$, and then process block 1260 calls Rank_Method which returns schedule S. Thereafter, process block 1265 returns (S, $d_{cur}$) to Procedure Lookahead, and the process ends at process block 1270.

Returning now to decision block 1232, if old is equal to the empty list, then processing continues to process block 1265 to return (S, $d_{cur}$) to Procedure Lookahead.

TABLE 3

| | FIG. 12 Reference Numeral |
|---|---|
| /* The inputs for Procedure merge are two sets of instructions, *old* and *new*, and the outputs are schedule S and deadlines $d_{cur}$ obtained by scheduling instructions in the union, *old* ∪ *new*. */ | |
| Merg(old, new, d<sub>old</sub>) | |
| *begin* Merge; | 1205 |
|    *cur* := *old* ∪ *new*; | 1210 |
|       set all deadlines in $d_{new}$ to D; */ D is artificially large deadline */ | 1215 |
|       S := Rank_Method(*cur*, E ∩(*cur* × *cur*), $d_{cur}$); /* run rank on nodes in cur */ | 1220 |
|       *for* x ∈ *old* set d(x) = min{d(x), $T_{old}$}; /* $T_{old}$ is the makespan of the schedule for *old*/ | 1225 |
|       *for* x ∈ *new* set d(x) = T; /* T is the makespan of the schedule S */ | 1230 |
|       *If old* = empty list, *return* (S, $d_{cur}$); | 1232 |
|       S := Rank_Method(*cur*, E ∩ (*cur* × *cur*), $d_{cur}$); /* run rank on nodes in cur */ | 1235 |
|       *while* S is infeasible | 1240 |
|          increase all deadlines in $d_{new}$ by 1; | 1245 |
|          compute S using the new values of $d_{new}$ | 1250 |
|       *end while* | |
|       $d_{cur}$ := $d_{old}$ ∪ $d_{new}$; | 1255 |
|          S := Rank_Method(*cur*, E ∩(*cur* × *cur*), $d_{cur}$); | 1260 |
|    *return* (S, $d_{cur}$); | 1265 |
| *end* Merge. | 1270 |

Figure 13:
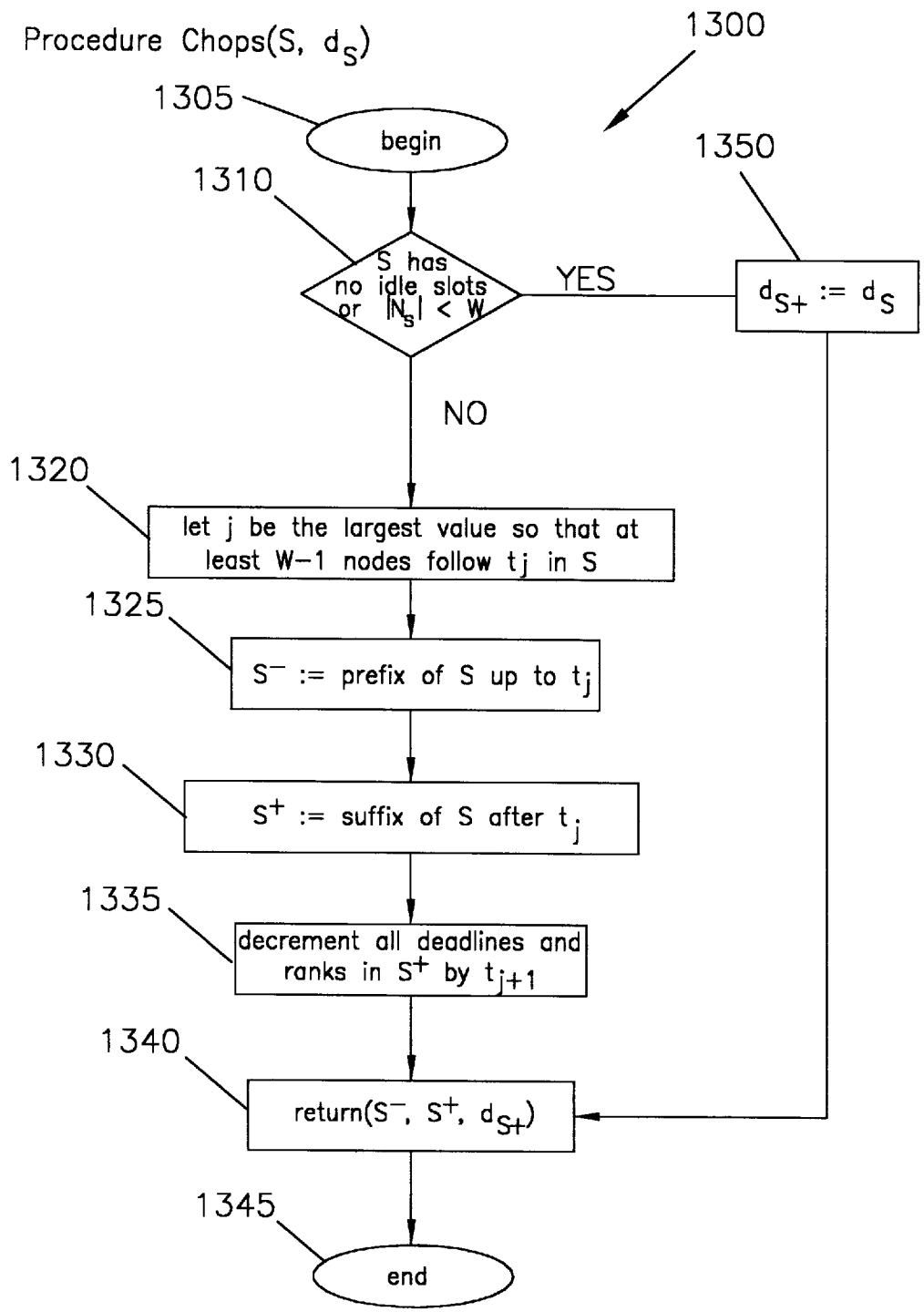
FIG. 13 is a flowchart illustrating the operations preferred in carrying out the Procedure Chop portion of the present invention.
Figure 14:
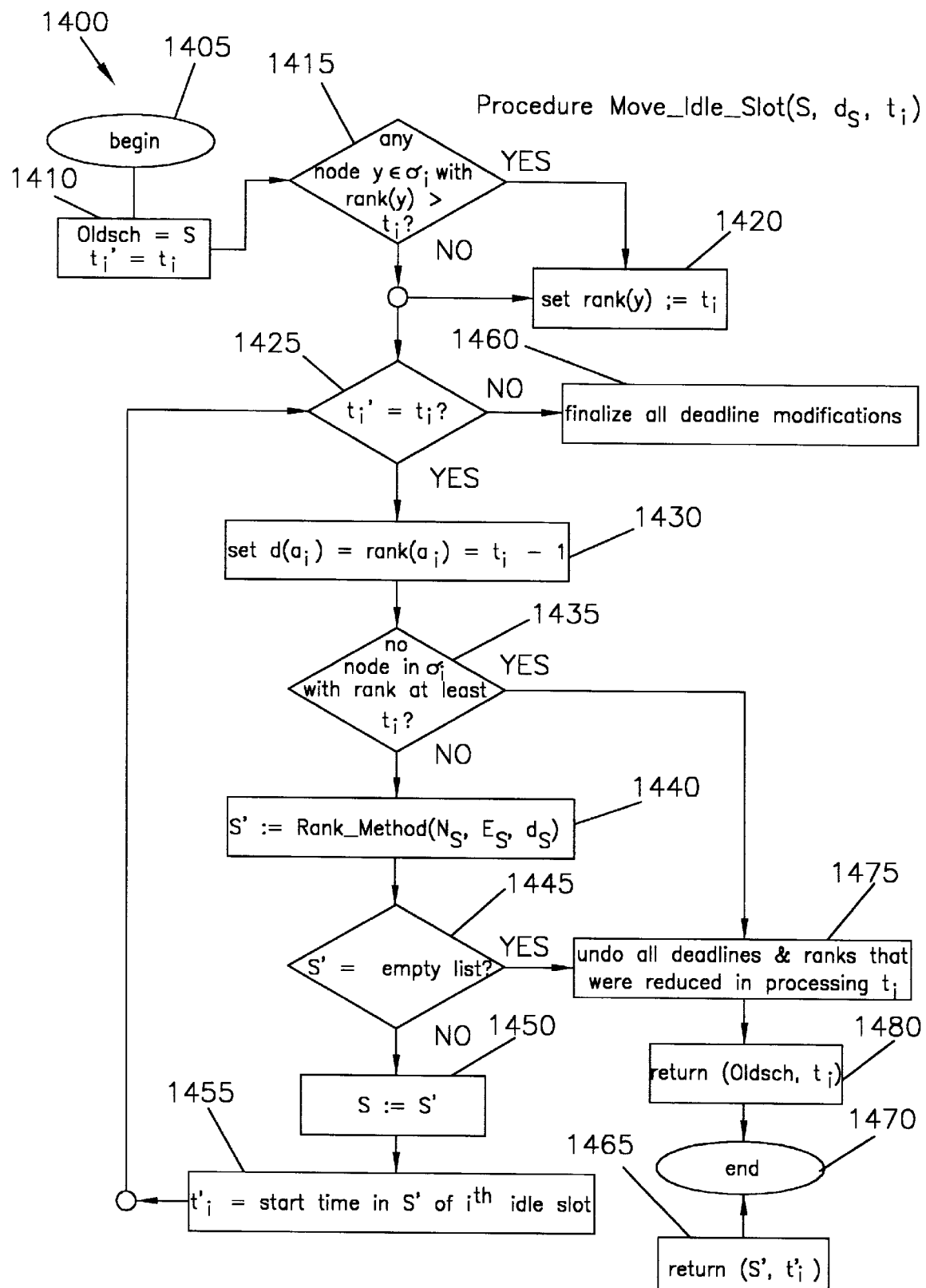
FIG. 14 is a flowchart illustrating the operations preferred in carrying out the Procedure Move_Idle_Slot portion of the present invention.

Referring next to FIG. 13, the operations preferred in carrying out the Procedure Chop portion of the present invention are shown. It can be proven mathematically that the modification to the Rank Method constructs a minimum completion time schedule in which each idle slot occurs as late as possible for the 0/1 latency unit execution time case on a single functional unit. It can also be proven that if the first and second idle slots start at times $t_1$ and $t_2$ in some schedule constructed by the Rank Method, then there exists no minimum completion time schedule in which the first idle slot starts later than $t_2-2$. Consequently, once idle slot $t_i$ has been moved as late as possible, assuming that all previous idle slot have also been moved as late as possible, if there are more than W nodes with start times greater than $t_j$, all nodes that precede $t_i$ can be "chopped" and reduce the problem size.

Referring now to FIG. 13, the process begins at process block 1305, and thereafter, decision block 1310 determines if S has no idle slots or if $|N_s|<W$ If S has idle slots and if $|N_s|$ not less than W, then process block 1320 lets j be the largest value so that at least w−1 nodes follow $t_j$ in S. Thereafter, process block 1325 sets $D^-$ equal to the prefix of S up to $t_j$, and process block 1330 sets $S^+$ equal to the suffix of S after $t_j$. Process block 1335 then decrements all deadlines and ranks in $S^+$ by $t_j+1$, and process block 1340 returns ($S^-$, $S^+ \cdot d_s+$) to Procedure Lookahead. The process then ends at process block 1345.

Returning now to decision block 1310, if S has no idle slots or if $|N_s|<W$, then process block 1350 sets $d_{S+}$ equal to $d_S$, and then processing continues to process block 1340 which returns ($S^-$, $S^+ \cdot d_S+$) to Procedure Lookahead.

TABLE 4

| | FIG. 13 Reference Numeral |
|---|---|
| /* Let $t_1, t_2, \ldots, t_k$ be the start times of the idle slots in S. */ | |
| Chop(S,$d_S$) | |
| begin Chop; | 1305 |
| if S has no idle slots or if $|N_S| < W$ | 1310 |
| $\quad d_{S+} := d_S$; | 1350 |
| else | |
| $\quad$ let j be the largest value so that at least | 1320 |
| $\quad$ W−1 nodes follow $t_j$ in S; | |
| $\quad S^-$ := prefix of S up to $t_j$; | 1325 |
| $\quad S^+$ := suffix of S after $t_j$; | 1330 |
| $\quad$ decrement all deadlines & ranks in $S^+$ by $t_j+1$; | 1335 |
| endif | |
| return ($S^-$, $S^{+}$ $d_S+$); | 1340 |
| end Chop. | 1345 |

Referring next to FIG. 14, the operations preferred in carrying out the Procedure Move_Idle_Slot portion of the present invention are shown. The process begins at process block 1405, and thereafter, process block 1410 sets $t_{i'}$ equal to $t_i$, and Oldsch equal to S. To insure that idle slots don't move earlier, decision block 1415 determines if there is any node $y \in \sigma_i$ with rank(y) greater than $t_i$. If there is not any node $y \in \sigma_i$ with rank(y) greater than $t_i$, then a do-while $t'_i = t_i$ loop comprising process blocks 1425, 1430, 1435, 1440, 1445, 1450, and 1455 processes the schedule. Decision block 1425 determines if $t'_i$ is equal to $t_i$. If $t'_i$ is equal to $t_i$, then process block 1430 sets $d(a_i)$ and rank($a_i$) equal to $t_i-1$. Thereafter, decision block 1435 determines if there is no node in $\sigma_i$ with rank at least $t_i$. If there is a node in $\sigma_i$ with rank at least $t_i$, then process block 1440 calls Rank_Method to compute a new schedule using the modified deadlines. Thereafter, decision block 1445 determines if S' is equal to the empty list. If S' is not equal to the empty list, then process block 1450 sets S equal to S', and process block 1455 sets $t'_i$ equal to the start time in S' of the $i^{th}$ idle slot. Thereafter, processing loops back to decision block 1425 to process the next idle slot.

Returning now to decision block 1445, if S' is equal to the empty list meaning that the Rank Method cannot meet all deadlines, then process block 1475 undoes all deadlines and ranks that were reduced in processing $t_i$. Thereafter, process block 1480 returns (Oldsch, $t_i$) to Procedure Lookahead, and then the process ends at process block 1470.

Returning now to decision block 1435, if there is no node in $\sigma_1$ with rank at least $t_i$, then processing continues to process block 1475 which undoes all deadlines and ranks that were reduced in processing $t_i$.

Returning now to decision block 1425, if $t'_i$ is not equal to $t_i$, then $t_i$ has been delayed and process block 1460 finalizes all deadline modifications, and process block 1465 returns (S', $t'_i$) to Procedure Lookahead. Thereafter, the process ends at process block 1470.

Returning now to decision block 1415, if there is a node $y \in \sigma_1$ with rank(y) greater than $t_i$, then process block 1420 sets rank(y) equal to $t_i$, and then processing continues to decision block 1425.

TABLE 5

| | FIG. 14 Reference Numeral |
|---|---|
| Procedure Move_Idle_Slot(s, $d_S$, $t_i$) | |
| /* $t_i$ is the idle slot currently being processed in schedule S. Procedure Move_Idle_Slot(S, $t_i$) returns $t_i$ if it fails to increase the start time of the $i^{th}$ idle slot, or it returns $t_i' > t_i$, if it succeeds in delaying the start time of the $i^{th}$ idle slot to $t'_i$. S is the most recently constructed (input) schedule. $a_i$ is the node scheduled at time $t_i - 1$ in S. */ | |
| begin Move_Idle_Slot(S, $d_S$, $t_i$); | 1405 |
| $\quad t_{i'} = t_i$; Oldsch = S; | 1410 |
| $\quad$ /* this step insures that idle slots don't move earlier */ | |
| $\quad$ if there is any node $y \in \sigma_i$ with rank(y) > $t_i$, | 1415 |
| $\quad\quad$ rank(y) = $t_i$; | 1420 |
| $\quad$ while $t'_i = t_i$ do | 1425 |
| $\quad\quad d(a_i) = rank(a_i) = t_i - 1$; | 1430 |
| $\quad\quad$ if there is no node in $\sigma_i$ with rank at least $t_i$ | 1435 |
| $\quad\quad\quad$ goto failure; | |
| $\quad\quad$ /* Rank_Method computes new schedule using modified deadlines */ | |
| $\quad\quad$ S' = Rank_Method($N_S$, $E_S$, $d_S$); | 1440 |
| $\quad\quad$ if S' = φ than /* the Rank Method cannot meet all deadlines */ | 1445 |
| $\quad\quad\quad$ goto failure; | |
| $\quad\quad$ S = S'; | 1450 |
| $\quad\quad t'_i$ = start time in S' of $t^{th}$ idle slot; | 1455 |
| $\quad$ end while | |

TABLE 5-continued

| | FIG. 14<br>Reference<br>Numeral |
|---|---|
| /* $t_i$ has been delayed */ | |
|     finalize all deadline modifications; | 1460 |
|     return(S', t'$_i$); | 1465 |
| Failure: Undo all deadlines and ranks that were reduced; | 1475 |
|     Return(Oldsch, t$_i$); | 1480 |
| end Move_Idle_Slot. | 1470 |

Applying the Method

In an alternative embodiment of the present invention, an attempt is made to delay only those idle slots that can potentially be moved into the window. In other words, if there are more than W nodes started after the idle slot at $t_i$ and either $t_i$ is the last idle slot or there are fewer than W-1 nodes started after the idle slot at time $t_{i+1}$, no attempt is made to move the first i-1 idle slots. Instead, the method or heuristic starting with $t_i$ is applied. The computation for moving $t_i$ could have the effect of also moving some earlier idle slots to later times.

In still another alternative embodiment of the present invention, the size of the computation is reduced by "freezing" the start times of all nodes started prior to $t_{i-1}$. Since the "frozen" nodes might still impact the remaining nodes because of non-zero latency edges, a dummy node is added that has an edge to every unscheduled node, thereby guaranteeing that dummy starts before any of the unscheduled nodes. For each unscheduled node x which has a frozen predecessor, let lat(dum, x) be the maximum amount that x must be delayed to guarantee that it does not violate any of the latencies involving its parents, given their frozen start times. Then all frozen nodes are eliminated, and assume that the schedule begins at time $t_{i-1}$, which is the time at which dummy will be started.

Applying the Method to the Multiple Functional Unit Problem

Yet another alternative embodiment of the present invention provides scheduling for a processor with multiple assigned functional units. Specifically, the processor has $c_1$ functional units of type $F_1$ (for example, two fixed point units), $c_2$ functional units of type $F_2$, and so on. The backscheduling method may be modified so that backscheduling on C=$c_1$+$c_2$ + . . . functional units is performed, where C is the total number of functional units in the processor.

Consider first the case in which each instruction requires unit time and is assigned to a particular type of functional unit. When computing rank(x) for some node x, assume that the ranks of all of the descendents of x are computed. The descendents of x are ordered according to their distance from x. Then each descendent is placed in a functional unit that correspond to the type of functional unit to which it is assigned, always choosing that functional unit in which it can be placed at the latest possible time no greater than its rank.

Other alternative embodiments may be used to handle instructions that require more than a single unit of time. One option that maintains the upper bound condition on the ranks is to break up longer instructions into single units and starting each unit at the latest possible time no greater than its rank in some functional unit of the correct type. The "piece" of the instruction that has the earliest start time assigned to it in the backscheduling method is used for the rank computation. Finally, if an instruction uses more than one type of functional unit, it is broken up into pieces, and the pieces are placed into the appropriate functional unit, again using the piece with the earliest start time for the rank computation.

An alternative approach for the rank computation for a longer instruction is to not break it up, but instead to insert each instruction whole into the schedule created by the backscheduling method so that it completes at the latest possible time no later than its rank.

Note that processing instructions with latencies greater than 1 is a trivial extension of the Rank Method, since the longer latencies are easily taken into account when computing the distance of an instruction from its predecessor whose rank is being computed.

Once the Rank Method has been used to construct a feasible schedule for the problem at hand, moving the idle slots later may be attempted by modifying the rank of a node that precedes an idle slot. Because of now dealing with multiple functional units, there can be multiple candidates for this modification. There then is another heuristic that determines where to chop the schedules, at what point in the schedule to try to delay the idle slots, and how many of the predecessors of idle slots are to be delayed. If there is a latency of k>1 and an idle interval starting at time $t_i$, then nodes with start times of $t_i$-k, $t_i$-(k-1), . . . , $t_i$-1 can be creating the idle interval. Generally, decrementing the ranks of too many nodes may cause excessive running time for the scheduling method. If k is large, another heuristic is to consider only nodes that start "shortly before" the idle slots.

In many processors, e.g. the "IBM RISC SYSTEM/6000", some instructions have non-unit execution times, but latencies tend to be only 0 or 1, and instructions tend to be assigned to a single functional unit, thereby increasing the practicality of the present invention.

In yet another alternative embodiment for a multiple functional unit processor in which a particular type of functional unit(s) is in great demand, the number of idle slots on that type of functional unit(s) is minimized. In this case, the rank of only a node on the specific type of functional unit would be reduced in an attempt to either move the idle slot earlier or eliminate it altogether.

System and/or Computer Program

Figure 15:
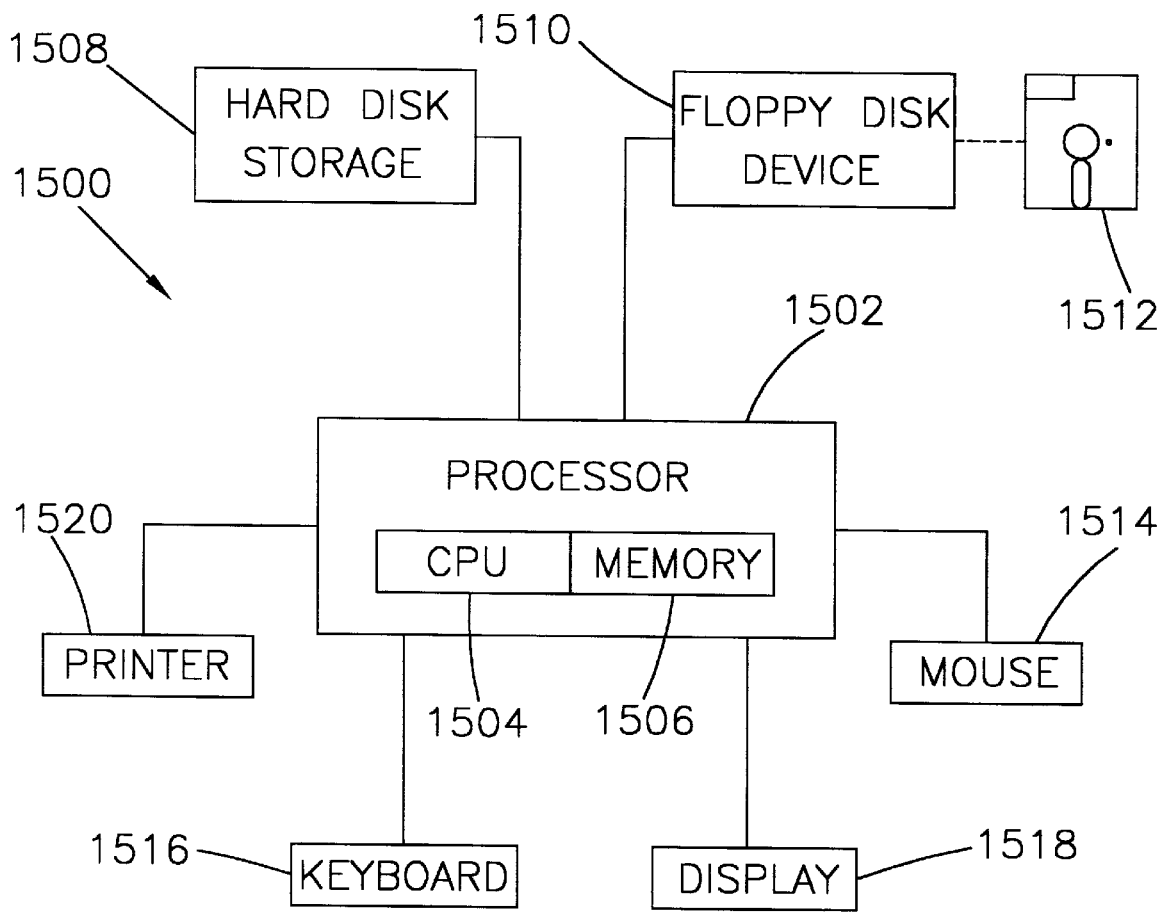
FIG. 15 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 15, a block diagram illustrates a computer system 1500 used in performing the method of the present invention, forming part of the apparatus of the present invention, and which may use the article of manufacture comprising a computer-readable storage medium having a computer program embodied in said medium which may cause the computer system to practice the present invention. The computer system 1500 includes a processor 1502, which includes a central processing unit (CPU) 1504, and a memory 1506. Additional memory, in the form of a hard disk file storage 1508 and a computer-readable storage device 1510, is connected to the processor 1502. Computer-readable storage device 1510 receives a computer-readable storage medium 1512 having a computer program embodied in said medium which may cause the computer system to implement the present invention in the computer system 1500. The computer system 1500 includes user interface hardware, including a mouse 1214 and a keyboard 1516 for allowing user input to the processor 1502 and a display 1518 for presenting visual data to the user. The computer system may also include a printer 1520.

Although the present invention has been particularly shown and described with reference to a preferred embodiment, it will be understood by those skilled in the art that various changes in form and detail may be made without departing from the spirit and the scope of the invention.

We claim:

1. A method of scheduling a plurality of instructions for execution by a processor having one or more functional units and a lookahead buffer, said lookahead buffer capable of storing a fixed number of the instructions to be issued and executed out of order as and when the instructions become ready for execution, said method comprising the steps of:
   a) identifying an idle slot in a first instruction schedule, said first instruction schedule comprising a schedule of slots in which each instruction of the first basic block is assigned a start time corresponding to one of the slots said idle slot comprising a slot in the first instruction schedule at which one of the functional units is not starting any one of the instructions of the first basic block; and
   b) delaying said idle slot to a later slot in said first instruction schedule, such that an instruction in a second subsequent basic block of instructions may be rescheduled to execute in the delayed idle slot.

2. The method of claim 1, wherein said step b) further comprises the step of:
   determining if said first basic block of instructions may be rescheduled into a second instruction schedule in which said identified idle slot is scheduled later than in said first instruction schedule.

3. The method of claim 2, further comprising the steps of:
   determining a completion deadline of said first instruction schedule;
   decreasing said completion deadline;
   determining said second instruction schedule based on said decreased completion deadline.

4. The method of claim 3, further comprising the steps of:
   computing a rank of each node of a DAG corresponding to said first basic block of instructions;
   constructing an ordered list of said DAG nodes in nondecreasing rank order; and
   applying a greedy scheduling heuristic to said ordered list.

5. The method of claim 1, further comprising the step of:
   c) rescheduling the instruction in the second subsequent basic block of instructions from said plurality of instructions to execute in said rescheduled idle slot.

6. The method of claim 1, wherein said step a) and said step b) are repeated for each idle slot in said first instruction schedule of said first basic block of instructions from said plurality of instructions.

7. A computer system for scheduling a plurality of instructions for execution by a processor having one or more functional units and a lookahead buffer, said lookahead buffer capable of storing a fixed number of the instructions to be issued and executed out of order as and when the instructions become ready for execution, said system comprising:
   a) means for identifying an idle slot in a first instruction schedule, said first instruction schedule comprising a schedule of slots in which each instruction of the first basic block is assigned a start time corresponding to one of the slots, said idle slot comprising a slot in the first instruction schedule at which one of the functional units is not starting any one of the instructions of the first basic block; and
   b) means for delaying said idle slot to a later slot in said first instruction schedule, such that an instruction in a second subsequent basic block of instructions may be rescheduled to execute in the delayed idle slot.

8. The computer system of claim 7, wherein said means b) further comprises:
   means for determining if said first basic block of instructions may be rescheduled into a second instruction schedule in which said identified idle slot is scheduled later than in said first instruction schedule.

9. The computer system of claim 8, further comprising:
   means for determining a completion deadline of said first instruction schedule;
   means for decreasing said completion deadline;
   means for determining said second instruction schedule based on said decreased completion deadline.

10. The computer system of claim 9, further comprising:
    means for computing a rank of each node of a DAG corresponding to said first basic block of instructions;
    means for constructing an ordered list of said DAG nodes in nondecreasing rank order; and
    means for applying a greedy scheduling heuristic to said ordered list.

11. The computer system of claim 7, further comprising:
    c) means for rescheduling the instruction in the second subsequent basic block of instructions from said plurality of instructions to execute in said rescheduled idle slot.

12. The computer system of claim 7, wherein said means a) and said means b) repeat for each idle slot in said first instruction schedule of said first basic block of instructions from said plurality of instructions.

13. an article of manufacture for use in a computer system for scheduling a plurality of instructions for execution by a processor of said computer system, said processor having one or more functional units and a lookahead buffer, said lookahead buffer capable of storing a fixed number of the instructions to be issued and executed out of order as and when the instructions become ready for execution, said article of manufacture comprising a computer-readable storage medium having a computer program embodied in said medium which may cause the computer system to:
    a) identify an idle slot in a first instruction schedule, said first instruction schedule comprising a schedule of slots in which each instruction of the first basic block is assigned a start time corresponding to one of the slots, said idle slot comprising a slot in the first instruction schedule at which one of the functional units is not starting any one of the instructions of the first basic block; and
    b) delay said idle slot to a later slot in said first instruction schedule, such that an instruction in a second subsequent basic block of instructions may be rescheduled to execute in the delayed idle slot.

14. The article of manufacture of claim 13, wherein said computer program in causing said computer system to reschedule said idle slot, may further cause the computer system to:

determine if said first basic block of instructions may be rescheduled into a second instruction schedule in which said identified idle slot is scheduled later than in said first instruction schedule.

15. The article of manufacture of claim 14, wherein said computer program in causing said computer system to determine if said first basic block of instructions may be rescheduled, further causes the computer system to:

determine a completion deadline of said first instruction schedule;

decrease said completion deadline;

determine said second instruction schedule based on said decreased completion deadline.

16. The article of manufacture of claim 15, wherein said computer program further causes the computer system to:

compute a rank of each node of a DAG corresponding to said first basic block of instructions;

construct an ordered list of said DAG nodes in nondecreasing rank order; and apply a greedy scheduling heuristic to said ordered list.

17. The article of manufacture of claim 13, wherein said computer program may further cause the computer system to:

c) reschedule the instruction in the second subsequent basic block of instructions from said plurality of instructions to execute in said rescheduled idle slot.

18. The article of manufacture of claim 13, wherein said computer program further causes the computer system to repeat said identification a) and said rescheduling b) for each idle slot in said first instruction schedule of said first basic block of instructions from said plurality of instructions.

* * * * *